United States Patent
Lee et al.

(10) Patent No.: US 12,418,784 B2
(45) Date of Patent: Sep. 16, 2025

(54) METHOD AND DEVICE FOR GENERATING USER IDENTIFICATION MODEL ON BASIS OF WIRELESS SENSING

(71) Applicant: LG ELECTRONICS INC., Seoul (KR)

(72) Inventors: Hongwon Lee, Seoul (KR); Hangyu Cho, Seoul (KR); Jeonghwan Yoon, Seoul (KR); Homin Yoo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 17/921,315

(22) PCT Filed: May 7, 2020

(86) PCT No.: PCT/KR2020/006005
§ 371 (c)(1),
(2) Date: Oct. 25, 2022

(87) PCT Pub. No.: WO2021/225191
PCT Pub. Date: Nov. 11, 2021

(65) Prior Publication Data
US 2023/0209325 A1     Jun. 29, 2023

(51) Int. Cl.
| *H04W 8/00* | (2009.01) |
| *G06N 3/088* | (2023.01) |
| *G06N 3/09* | (2023.01) |
| *H04W 8/24* | (2009.01) |
| *H04W 84/12* | (2009.01) |

(52) U.S. Cl.
CPC ............ *H04W 8/005* (2013.01); *G06N 3/088* (2013.01); *G06N 3/09* (2023.01); *H04W 8/24* (2013.01); *H04W 84/12* (2013.01)

(58) Field of Classification Search
CPC ........ G06N 3/09; G06N 3/088; G06N 3/0895; G06N 20/00; H04W 8/005; H04W 8/24; H04W 4/80; H04W 84/12
See application file for complete search history.

(56) References Cited

U.S. PATENT DOCUMENTS

| 10,108,903 B1 | 10/2018 | Piao et al. | |
| 10,318,890 B1 | 6/2019 | Kravets et al. | |
| 2015/0245191 A1* | 8/2015 | Xu | ........................ H04W 8/005 370/338 |
| 2016/0381205 A1* | 12/2016 | You | ........................ H04W 4/027 455/418 |
| 2018/0197107 A1 | 7/2018 | Belous | |

(Continued)

FOREIGN PATENT DOCUMENTS

CN     108901021 A     11/2018

*Primary Examiner* — Congvan Tran
(74) *Attorney, Agent, or Firm* — BRYAN CAVE LEIGHTON PAISNER LLP

(57) ABSTRACT

Proposed is a method and device for generating a user identification model on the basis of wireless sensing in a wireless LAN system. Specifically, a user identification apparatus discovers a PED and acquires identification information about the PED. The user identification apparatus collects data and pre-processes the collected data on the basis of the identification information about the PED. The user identification apparatus generates a user identification model by learning the pre-processed data.

16 Claims, 24 Drawing Sheets

(a)

(b)

(56) References Cited

U.S. PATENT DOCUMENTS

2018/0249435 A1* 8/2018 Yu ..................... H04W 64/00
2019/0150134 A1* 5/2019 Kakinada ............. H04W 16/14
                                                          370/330
2020/0097690 A1   3/2020 Wan et al.

* cited by examiner (a)

(b)

METHOD AND DEVICE FOR GENERATING USER IDENTIFICATION MODEL ON BASIS OF WIRELESS SENSING

CROSS-REFERENCE TO RELATED APPLICATIONS

This application is the National Stage filing under 35 U.S.C. 371 of International Application No. PCT/KR2020/006005, filed on May 7, 2020, the contents of which are all hereby incorporated by reference herein in their entirety.

TECHNICAL FIELD

The present specification relates to a method for generating a user identification model based on wireless sensing, and more particularly, to a method and apparatus for acquiring a predictive model through post-learning by acquiring user identification information.

BACKGROUND

As wireless technology and sensing methods advance, many studies use wireless signals (for example, WiFi) to detect human activity, it has succeeded in realizing various fields of application, intrusion detection, daily activity recognition, vital sign monitoring related to more granular motion detection and gesture recognition for user identification, etc.

These applications can support a variety of domains for smart home and office environments, including safety protection, wellness monitoring/management, smart healthcare, and smart appliance interactions.

Human movement affects radio signal propagation (e.g., reflection, diffraction, and scattering), providing an excellent opportunity to capture human movement by analyzing the received radio signal. Because of its frequency-shifting, low-cost, and non-intrusive detection properties, whether researchers extract ready-to-use signal measurements or adopt frequency-modulated signals, wireless-based human activity detection has attracted considerable interest and has become a prominent research area in the past decade.

This specification examines the existing wireless sensing system in terms of basic principle, technology and system architecture. Specifically, this specification describes how wireless signals can be utilized to facilitate a variety of applications including intrusion detection, room occupancy monitoring, daily activity recognition, gesture recognition, vital sign monitoring, user identification and indoor location. Future research directions and limitations of using radio signals for human activity detection are also discussed.

SUMMARY

The present specification proposes a method and apparatus for generating a user identification model based on wireless sensing.

An example of the present specification proposes a method of generating a user identification model based on wireless sensing.

This embodiment proposes a method of generating a user identification model by performing supervised learning by obtaining personal identification information of a user device (PED) and labeling the collected data. This has a new effect of creating a new paradigm of IoT future smart home devices such as artificial intelligence devices that identify people by improving the learning method of wireless sensing-based user identification technology.

The user identification device discovers a PED (Personal Electric Device) and obtains identification information of the PED.

The user identification device collects data and pre-processes the collected data based on identification information of the PED.

The user identification device generates a user identification model by learning the pre-processed data.

According to the embodiment proposed in this specification, by improving the learning method of wireless sensing-based user identification technology, there is a new effect of creating a new paradigm of IoT future smart home devices such as artificial intelligence devices that identify people.

DETAILED DESCRIPTION

Figure 1:
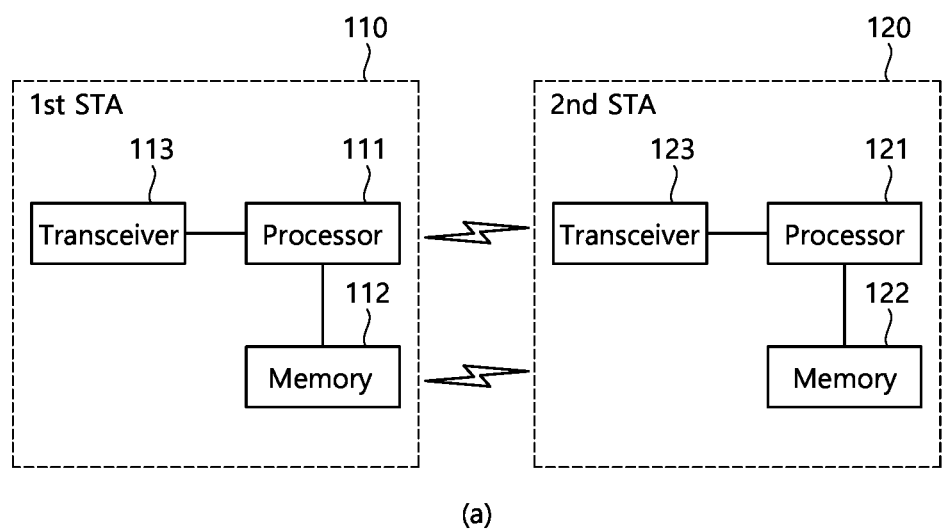
FIG. 1 shows an example of a transmitting apparatus and/or receiving apparatus of the present specification.
Figure 1:
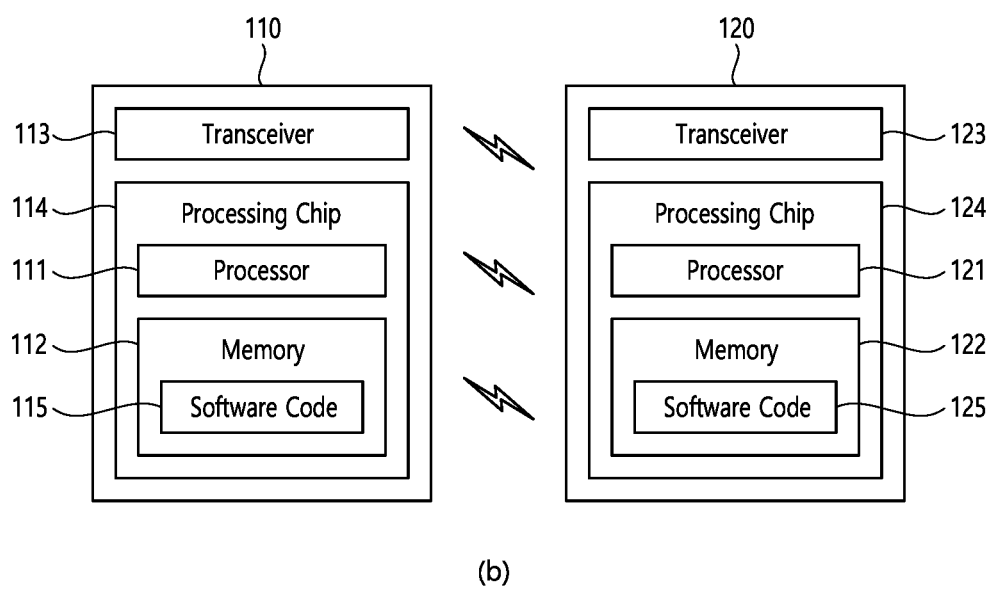

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may also be indicated as an AP STA.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
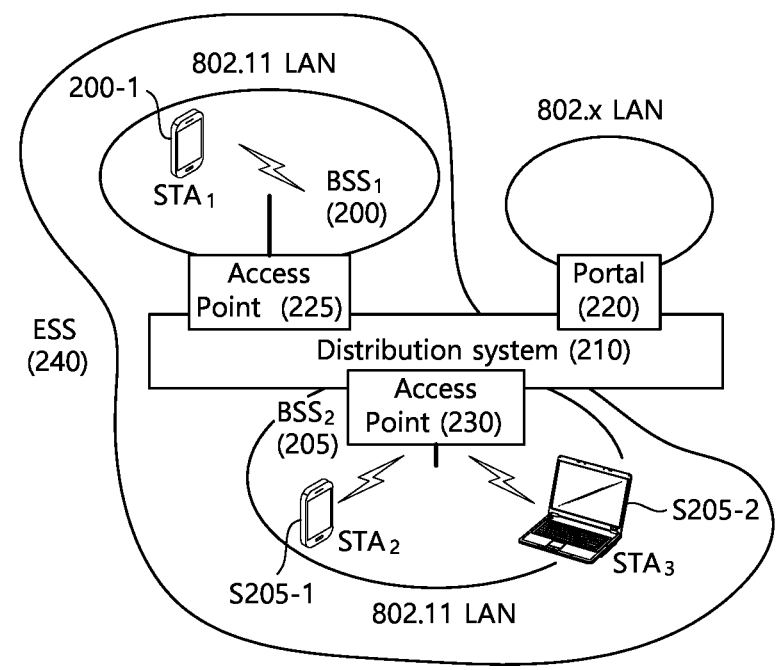
FIG. 2 is a conceptual view illustrating the structure of a wireless local area network (WLAN).
Figure 2:
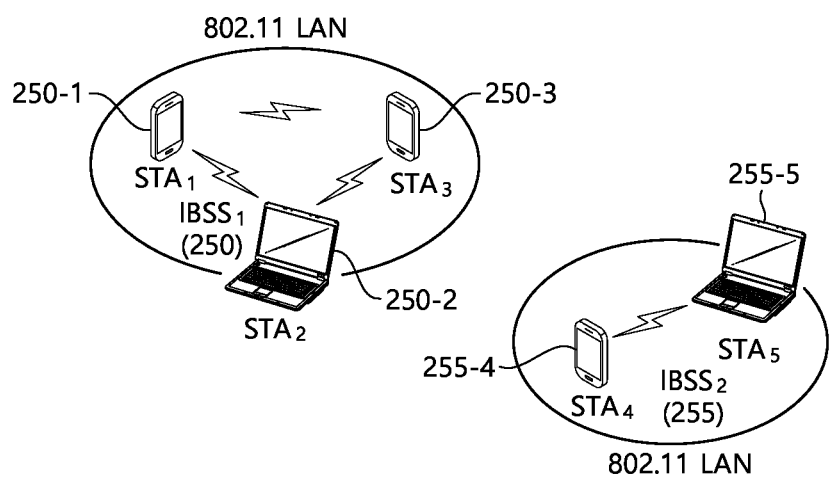

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e., IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
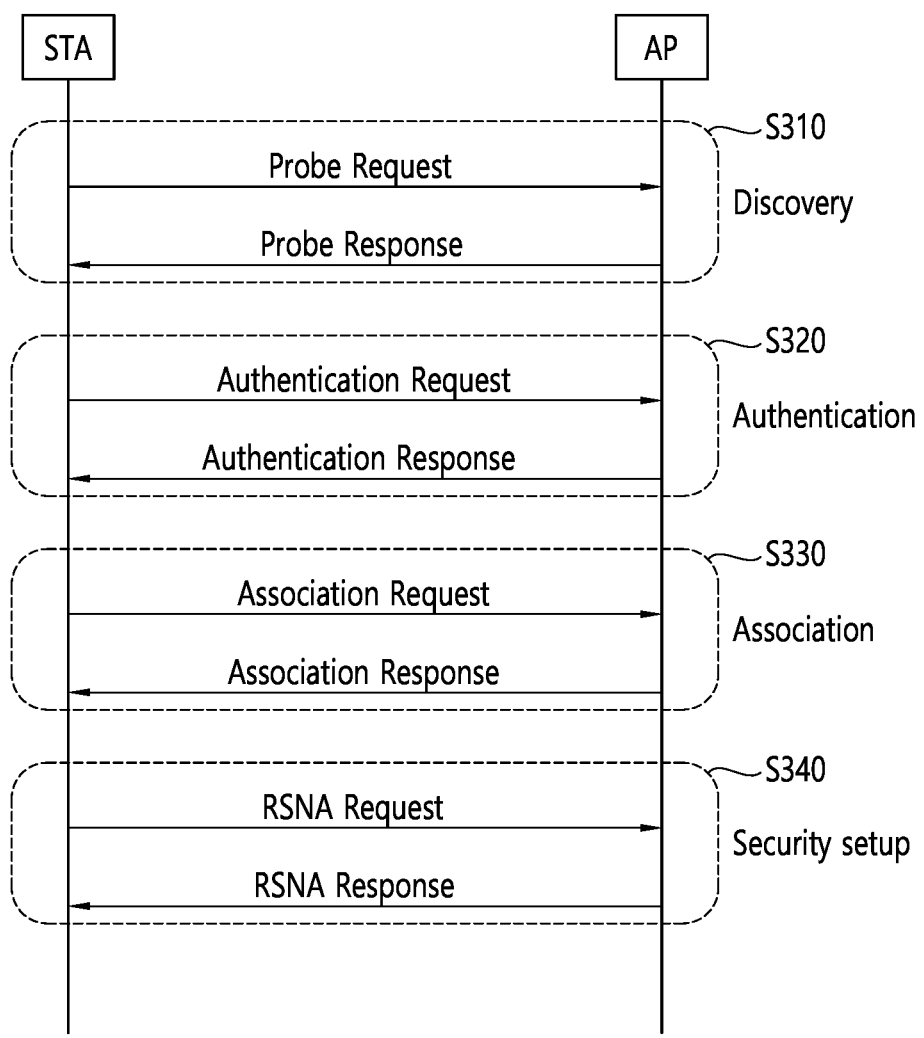
FIG. 3 is a drawing for explaining a general link setup process.

FIG. 3 is a drawing for explaining a general link setup process.

In the illustrated step S310, the STA may perform a network discovery operation. The network discovery operation may include a scanning operation of the STA. That is, in order for the STA to access the network, the STA needs to find a network in which it can participate. An STA must identify a compatible network before participating in a wireless network. The process of identifying a network existing in a specific area is called scanning. Scanning methods include active scanning and passive scanning.

FIG. 3 exemplarily illustrates a network discovery operation including an active scanning process. In active scanning, an STA performing scanning transmits a probe request frame to discover which APs exist around it while moving channels, and waits for a response thereto. A responder transmits a probe response frame to the STA that has transmitted the probe request frame in response to the probe request frame. Here, the responder may be an STA that last transmitted a beacon frame in the BSS of the channel being scanned. In the BSS, since the AP transmits a beacon frame, the AP becomes the responder. In the IBS S, the STAs in the IBSS rotate and transmit the beacon frame, so the responder is not constant. For example, an STA that has transmitted a probe request frame on channel 1 and received a probe response frame on channel 1 stores BSS-related information included in the received probe response frame, The STA may move to the next channel (e.g., channel 2) and perform scanning (i.e., probe request/response transmission/reception on channel 2) in the same manner.

Although not shown in the example of FIG. 3, the scanning operation may be performed in a passive scanning manner. An STA performing scanning based on passive scanning may wait for a beacon frame while moving channels. The beacon frame is one of the management frames in IEEE 802.11, and is periodically transmitted to inform the existence of a wireless network, and to allow a scanning STA to search for a wireless network and participate in the wireless network. In the BSS, the AP plays a role of periodically transmitting a beacon frame, and in the IBSS, the STAs in the IBSS rotate and transmit the beacon frame. When the STA performing scanning receives the beacon frame, it stores information on the BSS included in the beacon frame and records the beacon frame information in each channel while moving to another channel. Upon receiving the beacon frame, the STA may store BSS-related information included in the received beacon frame, move to the next channel, and perform scanning on the next channel in the same manner.

The STA discovering the network may perform an authentication process through step SS320. This authentication process may be referred to as a first authentication process in order to clearly distinguish it from the security setup operation of step S340 to be described later. The authentication process of S320 may include a process in which the STA transmits an authentication request frame to the AP, and in response, the AP transmits an authentication response frame to the STA. An authentication frame used for an authentication request/response corresponds to a management frame.

The authentication frame may include information on an authentication algorithm number, an authentication transaction sequence number, a status code, a challenge text, a Robust Security Network (RSN), and a Finite Cyclic Group, etc.

The STA may transmit an authentication request frame to the AP. The AP may determine whether to allow authentication for the STA based on information included in the received authentication request frame. The AP may provide the result of the authentication process to the STA through the authentication response frame.

The successfully authenticated STA may perform a connection process based on step S330. The association process includes a process in which the STA transmits an association request frame to the AP, and in response, the AP transmits an association response frame to the STA. For example, the connection request frame may include information related to various capabilities, a beacon listening interval, a service set identifier (SSID), supported rates, supported channels, RSN, and mobility domain, supported operating classes, TIM broadcast request (Traffic Indication Map Broadcast request), interworking service capability, and the like. For example, the connection response frame includes information related to various capabilities, status codes, Association IDs (AIDs), support rates, Enhanced Distributed Channel Access (EDCA) parameter sets, Received Channel Power Indicator (RCPI), Received Signal to Noise (RSNI). indicator), mobility domain, timeout interval (association comeback time), overlapping BSS scan parameters, TIM broadcast response, QoS map, and the like.

Thereafter, in step S340, the STA may perform a security setup process. The security setup process of step S340 may include, for example, a process of private key setup through 4-way handshaking through an Extensible Authentication Protocol over LAN (EAPOL) frame.

As the demand for wireless data traffic increases, WiFi networks grow very rapidly as they provide high throughput and are easy to deploy. Recently, Channel State Information (CSI) measured by a WiFi network is widely used for various sensing purposes. In order to better understand the existing WiFi sensing technology and the future WiFi sensing trend, this specification comprehensively reviews the signal processing technology, algorithm, application, and performance results of WiFi sensing using CSI. Different WiFi sensing algorithms and signal processing technologies have their own advantages and limitations and are suitable for different WiFi sensing applications. This specification classifies CSI-based WiFi sensing applications into three categories: sensing, recognition, and estimation according to whether the output is binary/multi-class classification or numeric. With the development and deployment of new WiFi technologies, there will be more WiFi sensing opportunities where objects can move from humans to the environment, animals and objects.

This specification emphasizes the coexistence of three challenges in WiFi sensing: robustness and generalization, privacy and security, and WiFi sensing and networking. In addition, this specification proposes three future WiFi sensing trends: inter-layer network information integration, multi-device cooperation, and convergence of different sensors to enhance the existing WiFi sensing function and enable new WiFi sensing opportunities.

With the growing popularity of wireless devices, WiFi is growing very rapidly. One of the key technologies for WiFi's success is Multiple-Input Multiple-Output (MIMO), which provides high throughput to meet the growing demand for wireless data traffic. Together with Orthogonal Frequency-Division Multiplexing (OFDM), MIMO provides channel state information (CSI) for each transmit/receive antenna pair at each carrier frequency. Recently, CSI measurement of WiFi systems is used for various sensing purposes. WiFi sensing reuses the infrastructure used for wireless communication, making deployment easy and low cost. Also, unlike sensor-based and video-based solutions, WiFi sensing does not interfere with lighting conditions.

CSI refers to how a radio path propagates from a transmitter to a receiver at a specific carrier frequency along multiple paths. For WiFi systems with MIMO-OFDM, CSI is a 3D matrix of complex values representing the amplitude attenuation and phase shift of a multipath WiFi channel.

Time series of CSI measurements can be used for other wireless sensing applications by capturing how radio signals travel through surrounding objects and people in time, frequency, and spatial domains. For example, CSI amplitude fluctuations in the time domain have different patterns depending on human, activity, gesture, etc., which can be used for human presence detection, fall detection, motion detection, activity recognition, gesture recognition, and human identification/authentication.

CSI phase shift in the spatial and frequency domains, i.e., transmit/receive antenna and carrier frequencies, is related to signal transmission delay and direction, which can be used for human location and tracking. The CSI phase shift in the time domain can have other dominant frequency components that can be used to estimate the respiration rate. Various WiFi sensing applications have specific requirements for signal processing techniques and classification/estimation algorithms.

This specification proposes signal processing technologies, algorithms, applications, performance results, challenges, and future trends of WiFi sensing through CSI to increase understanding of existing WiFi sensing technologies and gain insight into future WiFi sensing directions.

Figure 4:
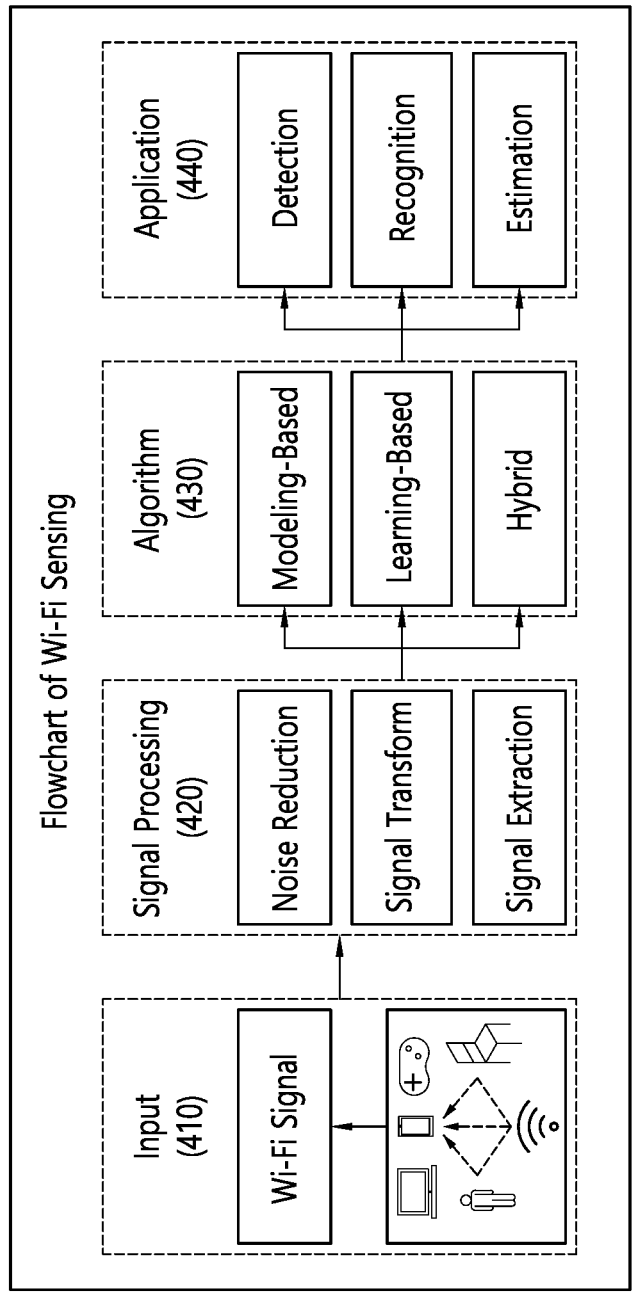
FIG. 4 shows a flowchart of a WiFi sensing procedure.

FIG. 4 shows a flowchart of a WiFi sensing procedure.

A WiFi signal (e.g., CSI measurement value) including a mathematical model, a measurement procedure, an actual WiFi model, a basic processing principle, and an experimental platform is input from the Input stage 410. Raw CSI measurements are fed to a signal processing module for noise reduction, signal conversion and/or signal extraction as indicated by the Signal Processing stage 420.

The pre-processed CSI tracking is supplied as a modeling-based, learning-based or hybrid algorithm, such as the Algorithm stage 430, to obtain an output for various WiFi sensing purposes. Depending on the output type, WiFi sensing can be classified into three categories. At the Application stage 440, the detection/recognition application tries to solve the binary/multi-class classification problem, and the estimation application tries to obtain the quantity values of other tasks.

Figure 5:
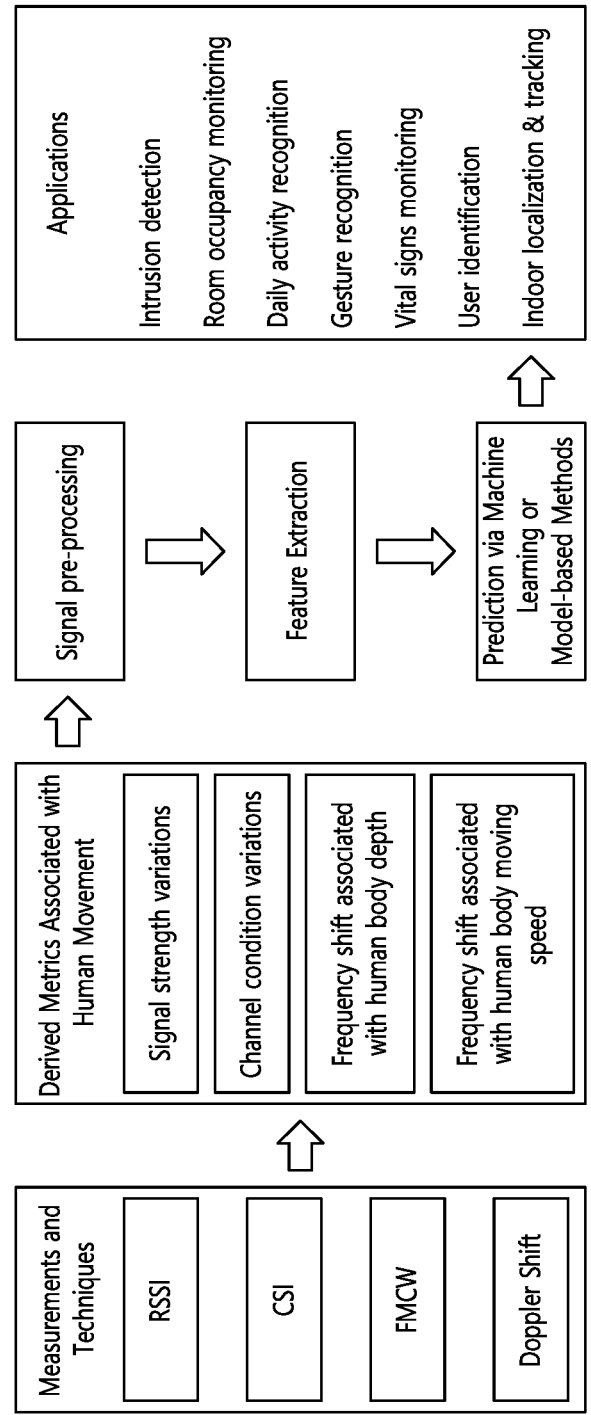
FIG. 5 shows a flow diagram of a general procedure of sensing human activity through a wireless signal.

FIG. 5 shows a flow diagram of a general procedure of sensing human activity through a wireless signal.

Specifically, the sensing system extracts signal changes related to human activity first based on different sensing methods (e.g., Received Signal Strength Indicator (RSSI), Channel State Information (CSI), Frequency Modulated Carrier Wave (FMCW) and Doppler shift).

That is, the human activity sensing procedure of FIG. 5 is as follows.
1) Measurements: Measure RSSI, CSI, Doppler shift, etc. as input values
2) Derived Metrics with Human movements: Signal strength variations, Channel condition variations, Frequency shift associated with human body depth, Frequency shift associated with human moving speed
3) Signal Pre-processing: Noise reduction, Signal Time-Frequency Transform, Signal Extraction
4) Feature Extraction: Extracts user ID features using gait cycle, body speed, and human activity
5) Prediction via Machine/Deep learning: Algorithms
6) Application: Detection, Recognition, Estimation (Intrusion detection, Room occupancy monitoring, Daily activity recognition, Gesture recognition, Vital signs monitoring, User identification, Indoor localization & tracking) of User identification prediction model
1. Wireless Sensing, Wi-Fi, Machine Learning

BACKGROUND OF THE DISCLOSURE

The IoT future smart home market is changing from device connection-centric to service-centric, and as a result, the need for AI device-based personalization and automation services is increasing. Wireless sensing-based technology, which is one of the element technologies for IoT service of artificial intelligence devices, is being actively developed. Among them, research on user identification by learning the pattern of a wireless signal such as Wi-Fi has unique characteristics according to a person's gait or behavior is being actively conducted.

Background Technology and Problems

In order to mount Wireless Sensing-based User Identification technology on commercial products, it is difficult to learn and distribute a model for prediction of data collected in Machine Learning in advance. (For example, a model that predicts dogs and cats is learned and deployed in advance and predicted new images not used in learning). The wireless signal may vary depending on the environment, even for the same user, as the signal pattern is different according to the influence of the user's movement. For this reason, since it is not possible to generate and distribute a general model in advance, it is necessary to create a model through learning suitable for each environment in order to mount a commercial product. However, prior learning using supervised learning used in existing research requires user participation for the collection and labeling of learning data (matching the correct answer of the data), so the practicality of commercialization is low.

Therefore, the present specification proposes a post-learning automation method for wireless sensing-based user identification.

When learning the wireless sensing signal pattern suitable for each environment, it enables post-learning by collecting the correct answer (e.g., label) for learning using the personal identification information of the user device (Personal Electronic Device—PED). The learning method for post-learning may be applied to various methods such as unsupervised learning, supervised learning, semi-supervised learning, and unsupervised/supervised fusion learning.

Through this embodiment, it is possible to implement a system that predicts by learning a signal pattern suitable for the user's home environment, thereby creating a new paradigm of IoT future smart home devices such as artificial intelligence devices that identify people.

Example of Wi-Fi CSI-based User Identification Study

An example of a study for learning/predicting using Wi-Fi CSI using wireless signal refinement, feature extraction, and machine learning is as follows.
1) Signal Pre-Processing
   CSI measurement collection—Collect CSI measurement values of 30~52 subcarriers based on 20 MHz bandwidth as many as the number of TX/RX antennas.
   Denoising—Removes noise from signals using algorithms such as PCA (Principal Component Analysis), phase unwrapping, and band-pass Butterworth filter.
   Transform to Time-Frequency domain—Spectrogram generation using STFT (Shot-Time Fourier Transform) (refer to FIG. 6)→ The denoising waveform is mixed with the reflection shape of the human body part, which can be classified by frequency.

Figure 6:
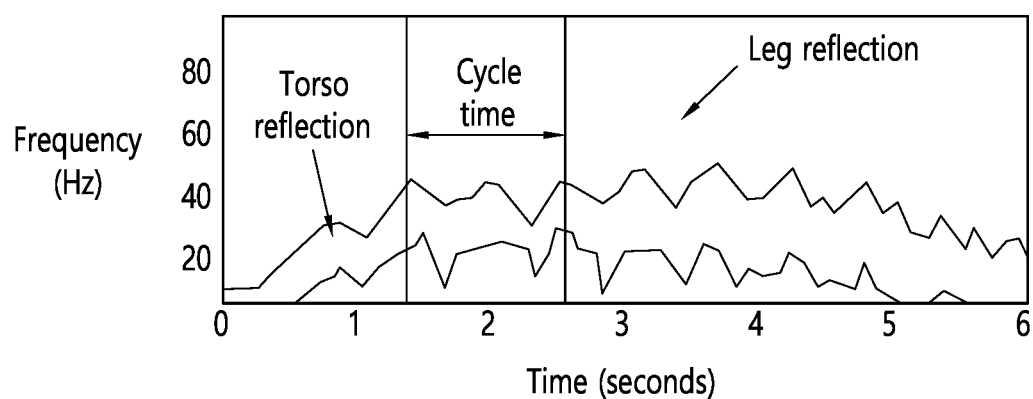
FIG. 6 shows a CSI spectrogram according to a human gait.

FIG. 6 shows a CSI spectrogram according to a human gait.

Referring to FIG. 6, torso reflection and leg reflection are illustrated in a CSI spectogram in a time/frequency domain. In this case, the CSI spectogram has a certain cycle time.
2) Feature Extraction
   The process of extracting features for user identification learning and prediction
   Use Gait Cycle Time, Movement (or Torso) Speed, Human Activity, etc.
   Based on the theory that the gait cycle is unique to each person, it is used as a feature of User Identification
   Example of body velocity estimation method: using the percentile method used in Doppler Radar
   Example of Human Activity estimation method: Predicting human movements and contours using time domain features (max, min, mean, skewness, kurtiosis, std), which are low level features of CSI; Predicting the movement speed of the trunk and legs using frequency domain features (spcetrogram energy, percentile frequency component, spectrogram energy difference); and Expressing walking or stationary activities using these features.
3) Machine/Deep Learning based training and prediction
   Learning and prediction through various machine/deep learning-based algorithms
   Representative Algorithm
   i) Supervised Learning: Using machine learning and deep learning learning algorithms such as decision tree-based machine learning classifier, SVM (Support Vector Machine), Softmax classifier, etc.
   i)-1 The predictive model is created only by supervised learning, and the unsupervised learning algorithm is used to construct the layers of the supervised learning model (some studies)

Learning Method
i) Select Training/Evaluation data at a specific ratio by collecting data under specific environmental conditions for each person (e.g., Training data: Evaluation data=8: 2)→Holdout verification
ii) Training data is trained by manually mapping the correct answer (e.g. Label) for each person and using it as an input for the Machine/Deep learning model.
iii) In some studies, auto feature extraction and clustering are performed using unsupervised learning to increase the degree of freedom of the data collection environment, and then user identification is performed using a supervised learning model (e.g., Softmax classifier).

Unsupervised learning is a learning method in which only the problem is studied without teaching the answer (label). According to unsupervised learning, the answer is found by clustering (a typical example of unsupervised learning), etc. based on the relationship between variables (e.g., recommending a YouTuber, classifying animals).

In contrast, supervised learning is a learning method that teaches and studies answers. Supervised learning is divided into regression and classification. Regression is a learning method that predicts outcomes within a continuous data range (e.g., age 0-100). Classification is a learning method that predicts outcomes within a range of discretely separated data (for example, whether a tumor is malignant or benign).

In addition, semi-supervised learning is a method of learning data with and without answers at the same time, and it is a learning method that studies a lot of data without answers without discarding them.

Figure 7:
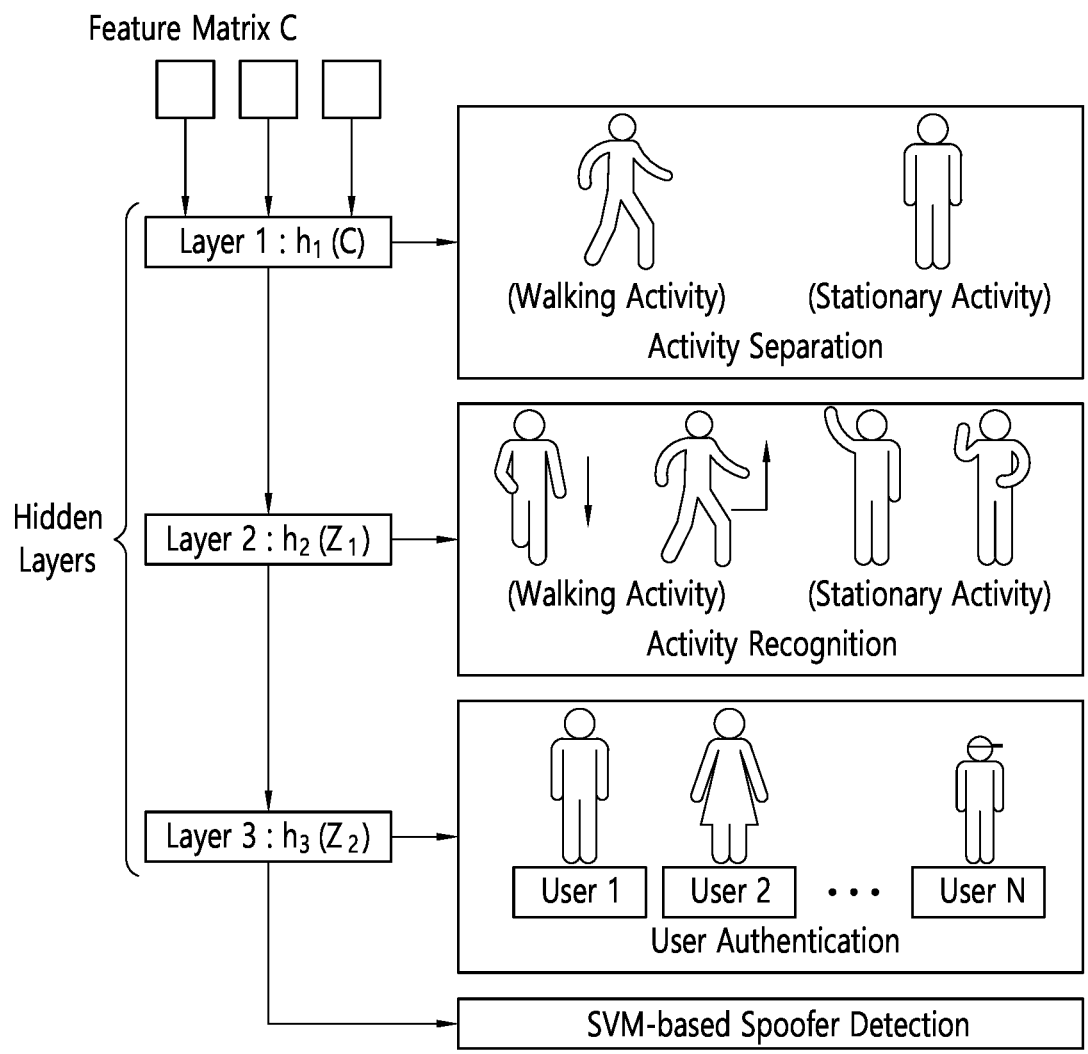
FIG. 7 shows a deep learning architecture for user authentication.

FIG. 7 shows a deep learning architecture for user authentication.

The deep learning architecture of FIG. 7 is an example of performing auto feature extraction using an autoencoder for each hidden layer and using softmax classification for classification.

Referring to FIG. 7, the supervised learning model constitutes each hidden layer, and the unsupervised learning model is used only for constructing the corresponding layer. Activity Separation, Activity Recognition, and User Authentication of FIG. 7 are all characteristics obtained by auto feature extraction.

Figure 8:
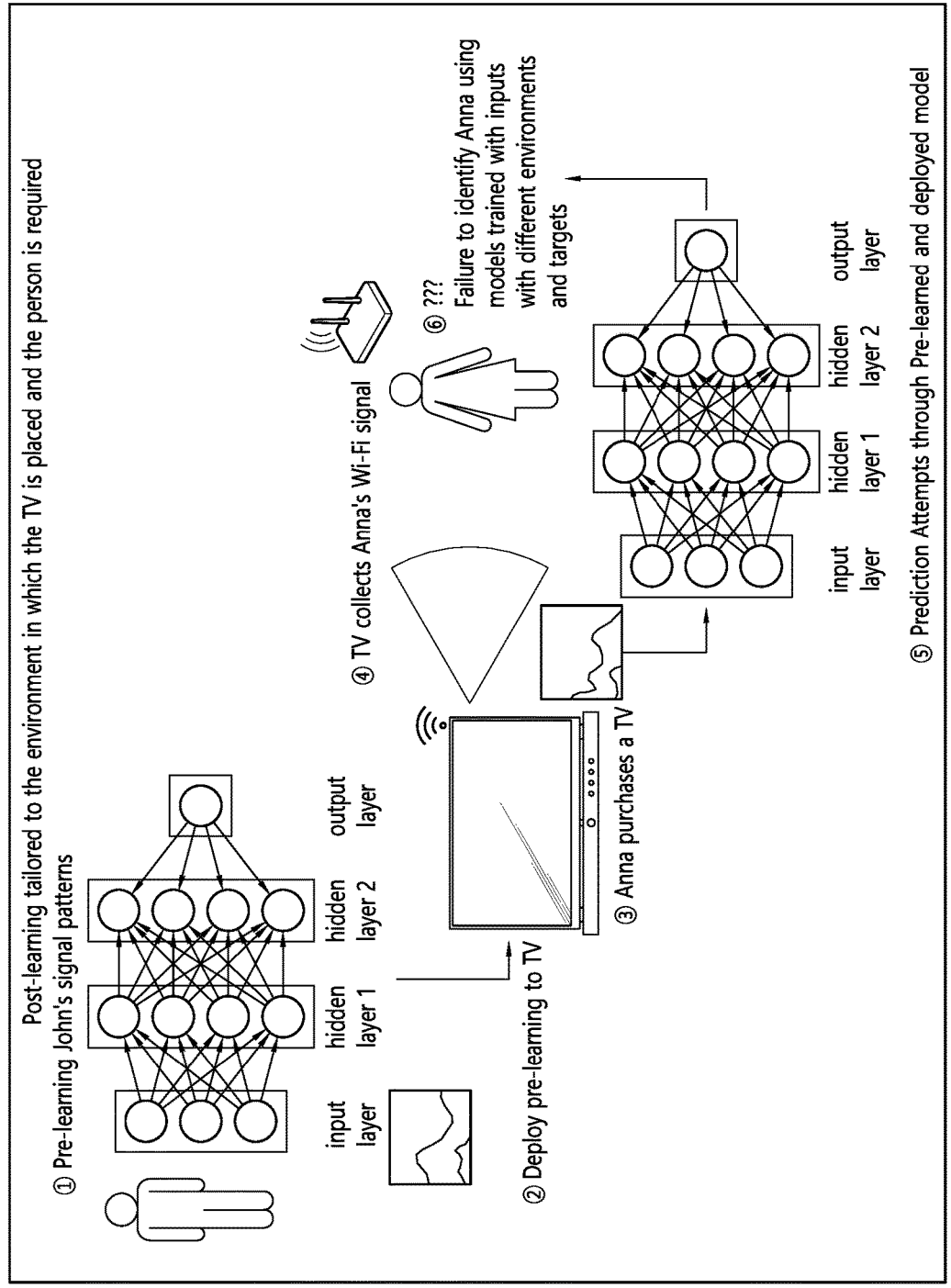
FIG. 8 shows a problem of a pre-supervised learning method in machine learning.

FIG. 8 shows a problem of a pre-supervised learning method in machine learning.

When learning Machine/Deep Learning for Wireless Sensing-based User Identification, it is difficult to apply pre-learning using supervised, which manually matches or assigns correct answers (e.g., labels), to commercial products for the following reasons.

First, there is a difficulty in generating a generalized model. This is because the wireless signal has different signal patterns depending on the environment, even for the same user.

In order to mount a commercial product, it is necessary to create a model through learning suitable for each environment.

Pre-learning using supervised used in existing research requires user participation for the collection and labeling of learning data (matching the correct answer of the data), which is not practical from a commercialization point of view.

Referring to FIG. 8, first, the machine learning device learns John's signal pattern in advance (1). At this time, pre-learning using supervised learning to inform that the corresponding signal is John's signal is performed. The machine learning device distributes the pre-learned model to the TV (2). Anna purchases the TV (3). The TV collects Anna's Wi-Fi signal (4). At this time, the TV attempts to predict the user identification model through the pre-learned and distributed model (5). However, since the TV uses a model trained with inputs (John's signal pattern) with different environments and objects, Anna cannot be identified (6). In other words, it can be seen that post-learning tailored to the environment and people in which the TV is placed is required.

Figure 9:
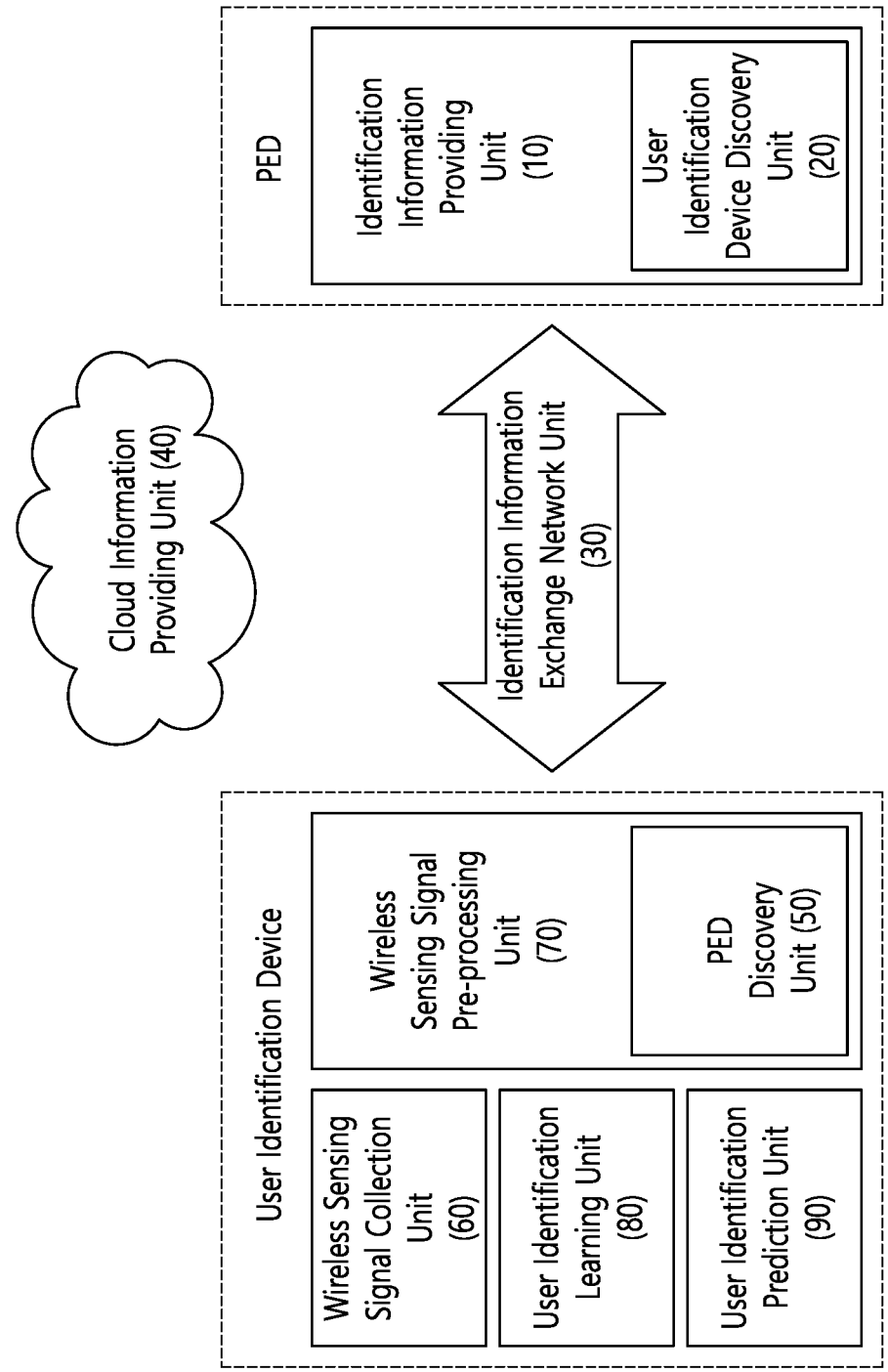
FIG. 9 shows an example of a block diagram of a user identification device and a PED.

FIG. 9 shows an example of a block diagram of a user identification device and a PED.

FIG. 9 illustrates a user identification device (e.g., home appliance), a Personal Electric Device (PED), and a communication section between the two devices.

The PED learns the fusion of personal identification information and wireless sensing data. The functional unit of the PED includes an identification information providing unit 10 and a user identification device discovery unit 20.

The identification information providing unit 10 serves to provide user personal identification information (e.g. MAC address, International Mobile Equipment Identity (IMEI), serial number, user name, etc.). The user identification device discovery unit 20 serves to enable the PED to discover the user identification device (when the PED is a scanner) or advertise PED information (when the PED is an advertiser).

The user identification device and the PED include an identification information exchange network unit 30. The identification information exchange network unit 30 corresponds to a wireless network through which a user identification device receives information from a PED providing identification information.

In addition, the cloud information providing unit 40 serves to provide the user's personal identification information of the registered PED device based on the user identification device request.

The user identification device includes a PED (Personal Electric Device) discovery unit (50), a Wireless Sensing signal collection unit (60), a Wireless Sensing signal pre-processing unit (70), a User Identification learning unit (80), and a User Identification prediction unit (90).

The PED discovery unit 50 serves to discover the PED for which the user identification device provides the user's personal identification information (when the PED is an Advertiser) or advertise the information of the user identification device (when the PED is a Scanner).

The Wireless Sensing signal collection unit 60 collects a Wireless Signal (e.g. Wi-Fi Signal) for user identification learning.

The wireless sensing signal pre-processing unit 70 serves to match signal preprocessed and collected signal and user identification information and collected signal collected through the information exchange network unit 30.

The User Identification learning unit 80 and the User Identification prediction unit 90 serve to learn and predict Wireless Sensing collected/signal-processed data for the purpose of user identification.

Specifically, this specification describes a procedure for performing post-learning by using the personal identification information collected by the user identification device from the PED.

This specification describes a method for automatically performing post-learning using user identification information of the PED when learning Machine/Deep Learning for user identification through Wireless Sensing (for example, User Identification using the difference in gait for each user through Wi-Fi CSI signal).

Figure 10:
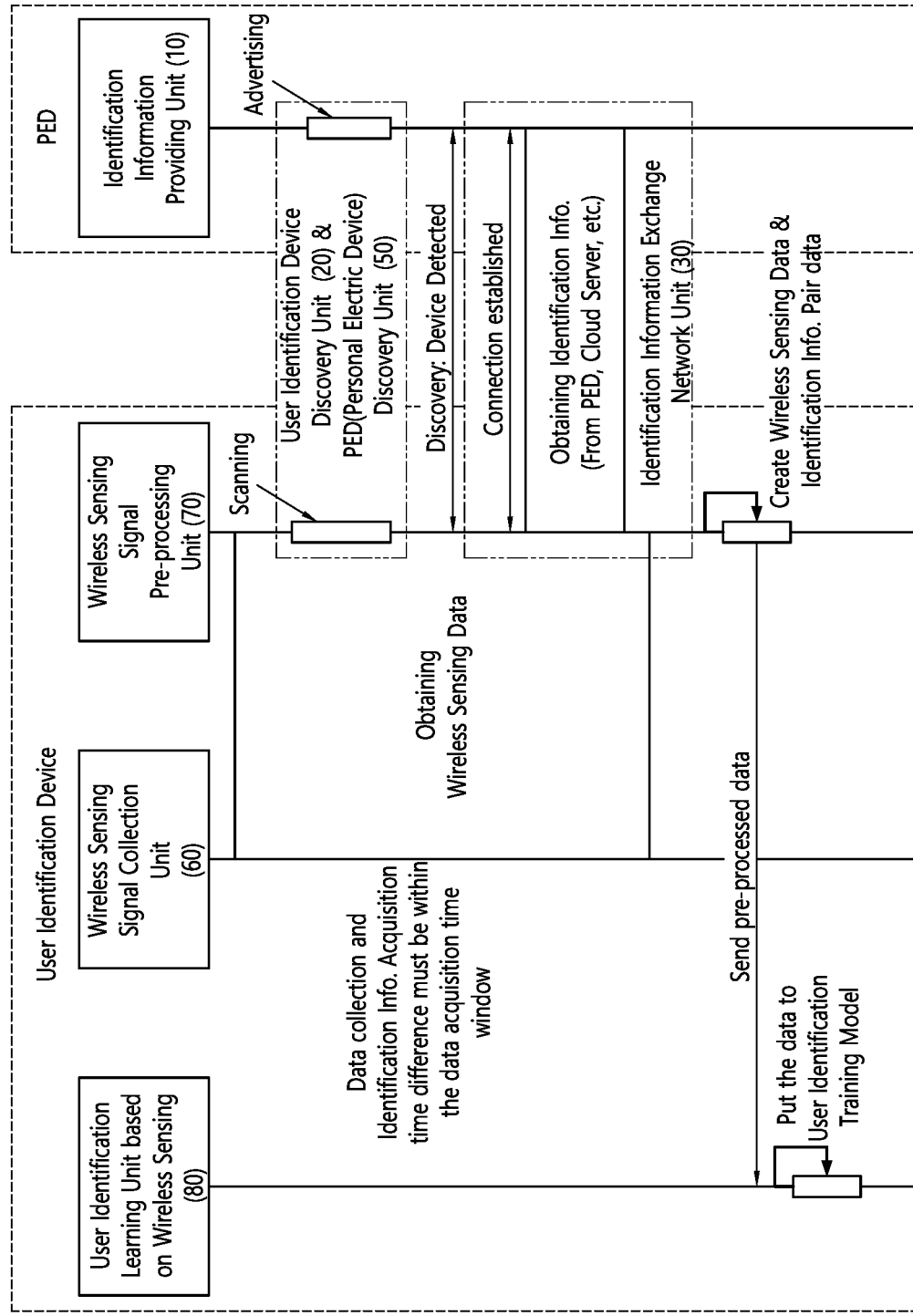
FIG. 10 is a flowchart illustrating a user identification information acquisition process in which the PED acts as an Advertiser.

FIG. 10 is a flowchart illustrating a user identification information acquisition process in which the PED acts as an Advertiser.

Figure 11:
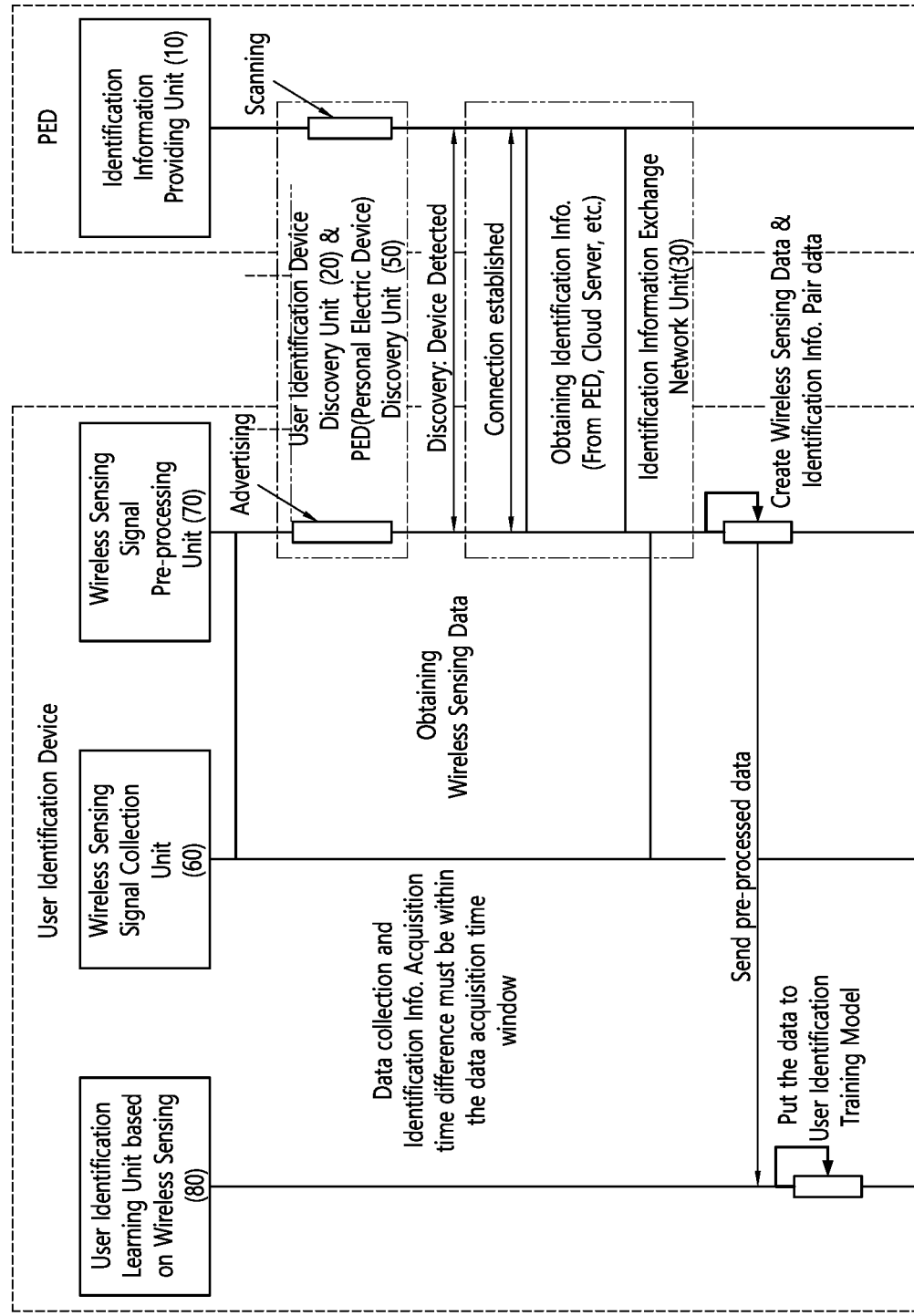
FIG. 11 is a flowchart illustrating a user identification information acquisition process in which the PED acts as a scanner.

FIG. 11 is a flowchart illustrating a user identification information acquisition process in which the PED acts as a scanner.

Figure 12:
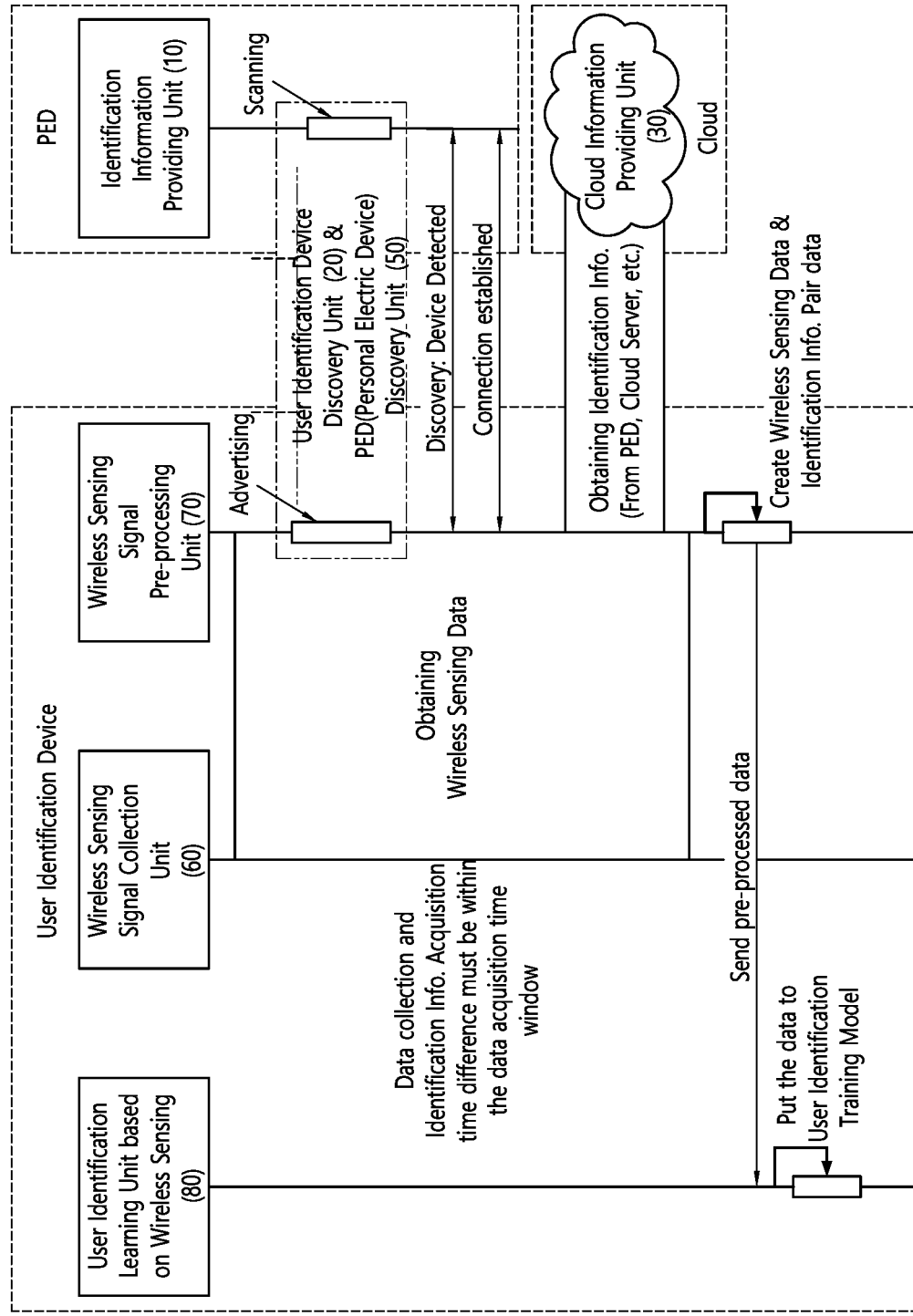
FIG. 12 is a flowchart illustrating a process of obtaining user identification information through the Cloud.

FIG. 12 is a flowchart illustrating a process of obtaining user identification information through the Cloud.

To summarize the terms used in FIGS. 10 to 12, acquiring wireless sensing data refers to a procedure in which a user identification device (e.g., home appliance) collects a wireless signal. Discovery refers to a procedure in which a PED or a user identification device discovers a counterpart device. Obtaining identification information (Obtaining Identification Info) refers to a procedure in which the user identification device acquires identification information from the user's PED (Personal Electric Device). Scanning is a state in which a user identification device or PED searches for a counterpart. Advertising is a state in which a user identification device or PED informs the surroundings that it is there. The identification information (Identification Info) message is a message composed of user identification information provided by the PED.

The process of obtaining and using PED user identification information (e.g., IMEI, MAC address, person name, etc. to obtain the correct answer (e.g., Label) for Machine/Deep Learning supervised is as follows.

1. Discovery—User Identification Device Discovery Unit 20 and PED Discovery Unit 50

The process of the user identification device discovering the PED (the scan subject may change depending on the role of the PED)

When the PED is an Advertiser (FIG. 10), the user identification device discovery unit 20 scans (acquires) the advertising information of the PED discovery unit 50 to discover the PED, or When the PED is a Scanner (FIG. 11), the PED discovery unit 50 scans (acquires) the advertising information of the user identification device discovery unit 20 and informs the user identification device that the PED is nearby (for example, a method in which the PED discovers the user identification device (Discovery: Device Detected) and then informs the wireless network connection (Connection established) is possible).

Discovery of PED to obtain identification information can utilize the discovery mechanism of short-distance connectivity technologies such as Bluetooth, Wi-Fi, Zigbee, and NFC (Near Field Communication).

If there are multiple PEDs, the target can be reduced by using the device type filter of the PED (e.g., classifying smartphones, laptops, smart watches, etc. using Class of Device (COD) of Bluetooth).

Information on the device that recognizes the user's movement and the closest device can be acquired, and the closest device can be determined using short-range recognition technologies such as Bluetooth/Wi-Fi RSSI, Wi-Fi Location, and Bluetooth positioning.

If multiple PEDs are found in the vicinity, the discovery process may be canceled (in this case, if there are multiple pieces of personally identifiable information, the correct answer matching operation may not proceed).

When multiple PEDs are found in the vicinity, Multi personally identifiable information can be collected as one set (in this case, priority can be given to the main personally identifiable information, and prior information to distinguish it from when there is one person) can be used as).

PED providing personally identifiable information may be done with pre-certified devices (to identify non-family visitors).

2. Information Transferring—Identification Information Exchange Network Unit 30 and Cloud Information Providing Unit 40

Personal identification information of PED can be obtained by wireless communication means such as Bluetooth, Wi-Fi, Zigbee, NFC, 5G Personal identification information of the PED can be obtained from the same cloud environment as the server in which the device is registered (FIG. 12).

PED's user identification information (Identification Info) can use the user's unique information such as person name, IMEI, Mac address, and serial number.

The user's personal information (For example, if a family device is registered and information related to the family relationship of the devices is registered, name, gender, family relationship, etc. can be entered) can be specified using the device registration information of the PED (e.g., the connection information between the TV and the smartphone).

The Wireless Sensing signal pre-processing unit 70 serves to match the collected signal with user identification information collected through the signal pre-processed and collected signal and information exchange network unit 30.

Wireless Sensing signal collection unit 60 collects a Wireless Signal (e.g. Wi-Fi Signal) for user identification (User Identification) learning. The difference between the data (or radio signal) collection time and the identification information acquisition time must be within the data (or radio signal) collection time window. The data collection time window is a signal collection unit time, collects the corresponding time collection data to perform learning and prediction, and can be set to 1 second, 3 seconds, 5 seconds, etc. depending on the application.

3. Learning—User Identification Learning Unit 80 and User Identification Prediction Unit 90

The User Identification learning unit 80 and the User Identification prediction unit 90 serve to learn and predict the Wireless Sensing collection/signal processing data for the purpose of user identification (User Identification). Wireless Sensing Collected/signal-processed data is paired with identification information. The user identification learning unit 80 that has received the Wireless Sensing collection/signal processing data may predict the user identification model by adding the data to the user identification training model.

The obtained identification information may serve as a correct answer (e.g., a label) for supervised learning of the collected data.

The obtained identification information may serve as a correct answer (e.g., a label) for semi-supervised learning of the collected data.

The obtained identification information may serve to specify the category for the results of unsupervised learning of the collected data.

(For example, clustering results are created through unsupervised learning of the collected radio signals, and after a total of 4 (A, B, C, D) categories are created, Identification information can be assigned to the corresponding Category based on the most identification information→If personal identification information is 15 fathers, 2 mothers, and 1 son in Category A, all signal data belonging to Category A is assigned to identification information as father.

The obtained identification information can serve as a correct answer (e.g., a label) of the unsupervised learning and supervised learning fusion method of the collected data.

(For example, after classifying data by unsupervised learning, a label is given and then converted to supervised learning)

The obtained identification information may improve the accuracy of the prediction result.

(For example, if the result predicted by the collected data and the result identified by the user with PED ID are different, the prediction result can be corrected with the PED ID result)

The obtained identification information can be used for re-learning to improve the performance of the learning model.

(For example, when a new signal and personally identifiable information come together after the creation of the first learning model, it can lead to a re-learning process in which the correct answer is inferred by comparing the predicted result and the personally identifiable information, and the result is fed back to the learning model to correct the wrong result.

It is possible to learn and predict through cooperation between multiple user identification devices (for example, it is possible to learn and predict by exchanging Soft Information (collected signals or pre-processed signals) for learning).

Figure 13:
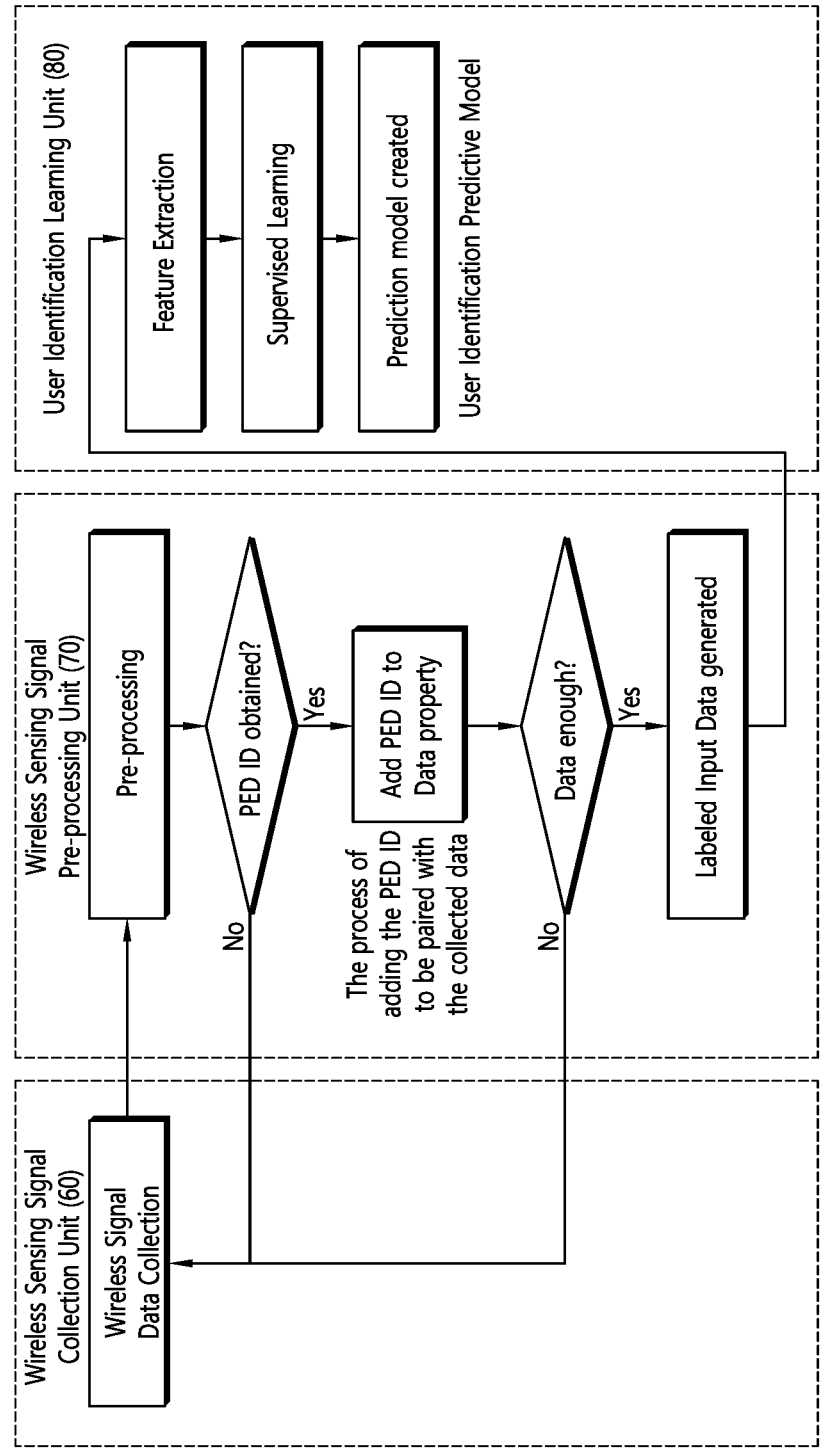
FIG. 13 is a flowchart illustrating a procedure for generating a user identification prediction model according to supervised learning.

FIG. 13 is a flowchart illustrating a procedure for generating a user identification prediction model according to supervised learning.

Referring to FIG. 13, the wireless sensing signal collecting unit 60 collects wireless signal data, and the wireless sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. If the PED ID is not obtained, the wireless sensing signal collection unit 60 collects wireless signal data again.

If the data matched with the PED ID is sufficient, the wireless sensing signal pre-processing unit 70 generates labeled input data. Here, the obtained PED ID may serve as a correct answer (Label) for supervised learning of the collected data.

The user identification learning unit 80 performs feature extraction for each hidden layer based on the labeled input data, and generates a user identification prediction model through supervised learning (or classification) (prediction model created).

Figure 14:
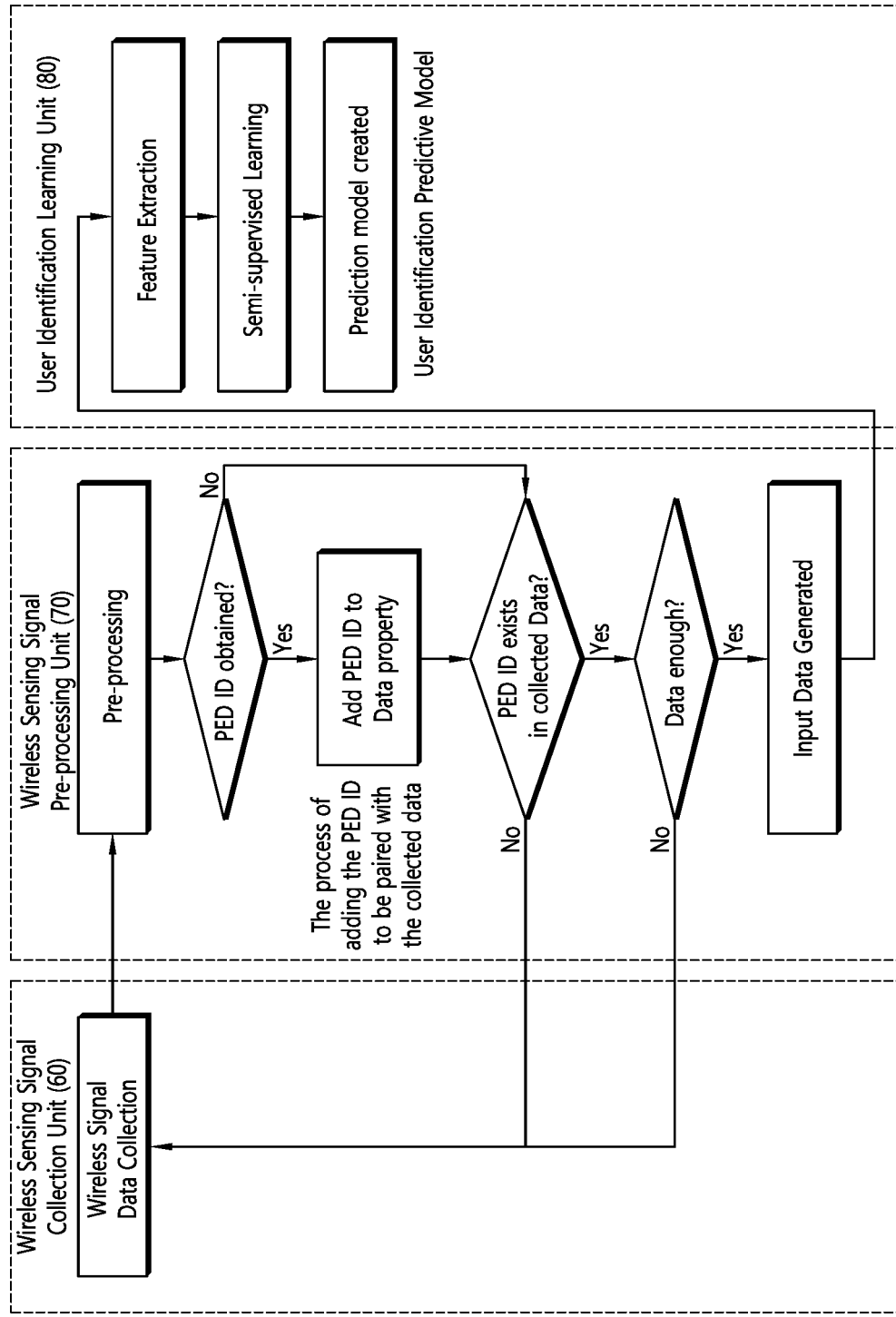
FIG. 14 is a flowchart illustrating a procedure for generating a user identification prediction model according to semi-supervised learning.

FIG. 14 is a flowchart illustrating a procedure for generating a user identification prediction model according to semi-supervised learning.

Referring to FIG. 14, the wireless sensing signal collecting unit 60 collects wireless signal data, and the wireless sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. If the PED ID is not obtained, the wireless sensing signal collection unit 60 collects wireless signal data again.

The wireless sensing signal pre-processing unit 70 also checks whether the PED ID exists in the collected data. If the PED ID does not exist in the collected data, the wireless sensing signal collecting unit 60 collects the wireless signal data again.

If the data matched with the PED ID is sufficient, the wireless sensing signal pre-processing unit 70 generates input data.

The user identification learning unit 80 performs feature extraction for each hidden layer based on the input data, and generates a user identification prediction model through semi-supervised learning (prediction model created).

Figure 15:
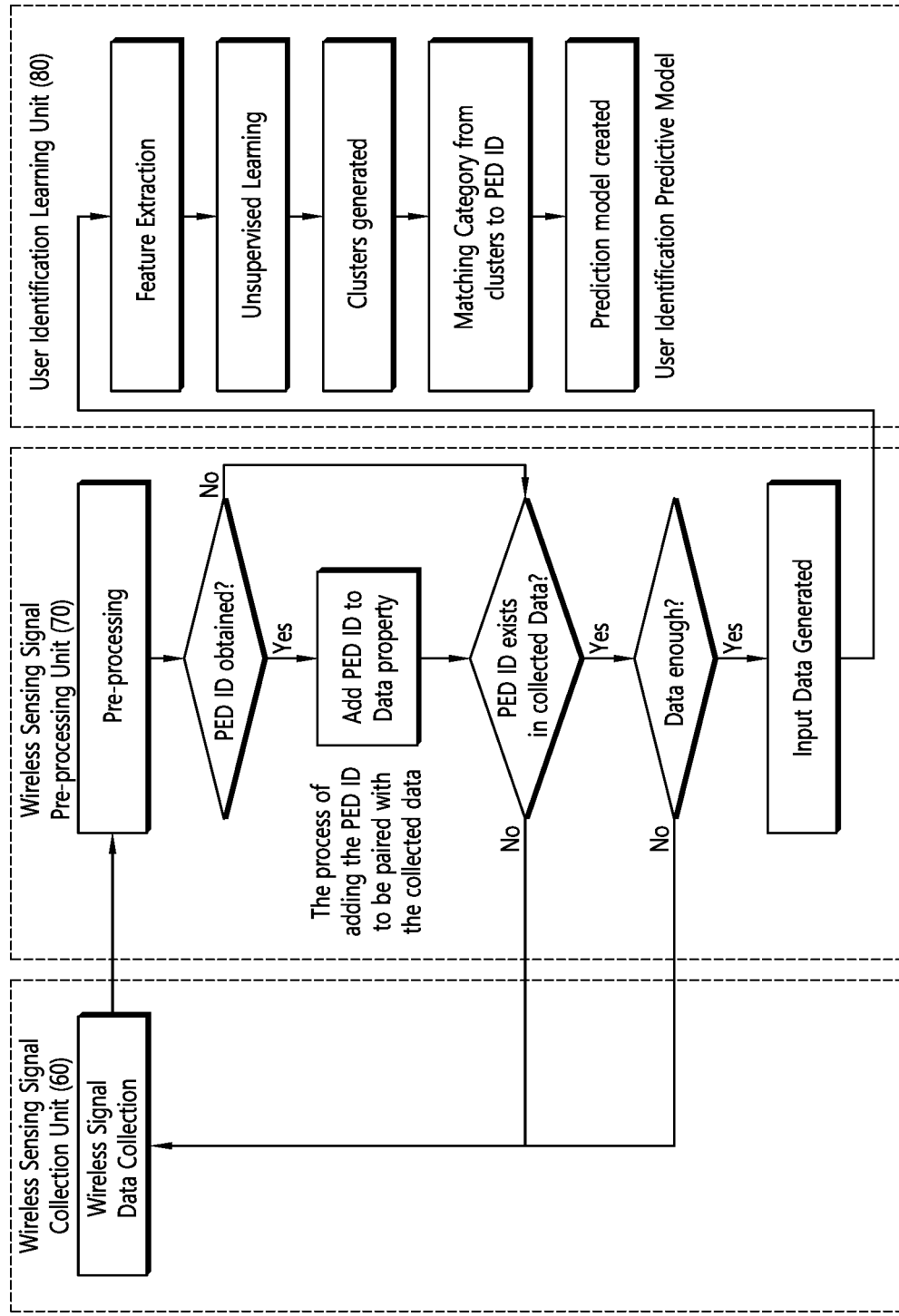
FIG. 15 is a flowchart illustrating a procedure for generating a user identification prediction model according to unsupervised learning.

FIG. 15 is a flowchart illustrating a procedure for generating a user identification prediction model according to unsupervised learning.

Referring to FIG. 15, the Wireless Sensing signal collecting unit 60 collects Wireless Signal Data, and the Wireless Sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. If the PED ID is not obtained, the wireless sensing signal collection unit 60 collects wireless signal data again.

The wireless sensing signal pre-processing unit 70 also checks whether the PED ID exists in the collected data. If the PED ID does not exist in the collected data, the wireless sensing signal collecting unit 60 collects the wireless signal data again.

If the data matched with the PED ID is sufficient, the wireless sensing signal pre-processing unit 70 generates input data.

The user identification learning unit 80 performs feature extraction for each hidden layer based on the input data, and generates a cluster (or a clustering result) through unsupervised learning. The User Identification learning unit 80 matches the generated category with the PED ID from the cluster (provides a PED ID for each category), and generates a user identification prediction model through this (prediction model created).

Figure 16:
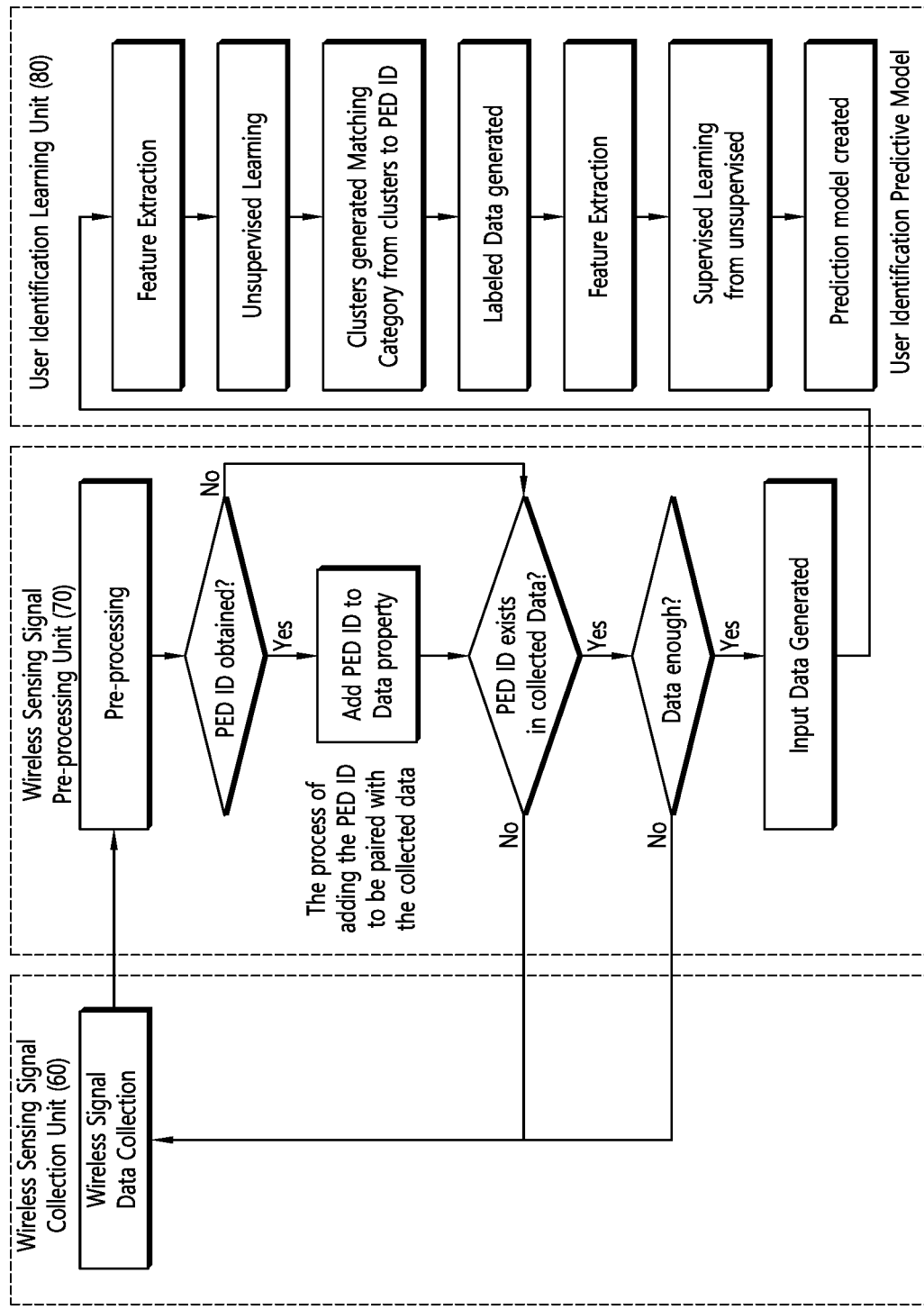
FIG. 16 is a flowchart illustrating a procedure for generating a user identification prediction model according to supervised learning and unsupervised learning.

FIG. 16 is a flowchart illustrating a procedure for generating a user identification prediction model according to supervised learning and unsupervised learning.

Referring to FIG. 16, the wireless sensing signal collecting unit 60 collects wireless signal data, and the wireless sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. If the PED ID is not obtained, the wireless sensing signal collection unit 60 collects wireless signal data again.

The wireless sensing signal pre-processing unit 70 also checks whether the PED ID exists in the collected data. If the PED ID does not exist in the collected data, the wireless sensing signal collecting unit 60 collects the wireless signal data again.

If the data matched with the PED ID is sufficient, the wireless sensing signal pre-processing unit 70 generates input data.

The user identification learning unit 80 performs feature extraction for each hidden layer based on the input data, and generates a cluster (or a clustering result) through unsupervised learning. The user identification learning unit 80 matches the generated category with a PED ID from the cluster (provides a PED ID for each category).

Here, the obtained PED ID may serve as a correct answer (Label) of the unsupervised learning and supervised learning convergence method of the collected data. For example, a label is given to the result of classifying data by unsupervised learning, and then it is converted to supervised learning.

The user identification learning unit 80 generates labeled input data by giving a label to a result of classifying data by unsupervised learning (a cluster or clustering result). The user identification learning unit 80 performs feature extraction for each hidden layer based on the labeled input data, and performs supervised learning (or classification) based on the result of unsupervised learning to create a user identification prediction model (prediction model created).

Figure 17:
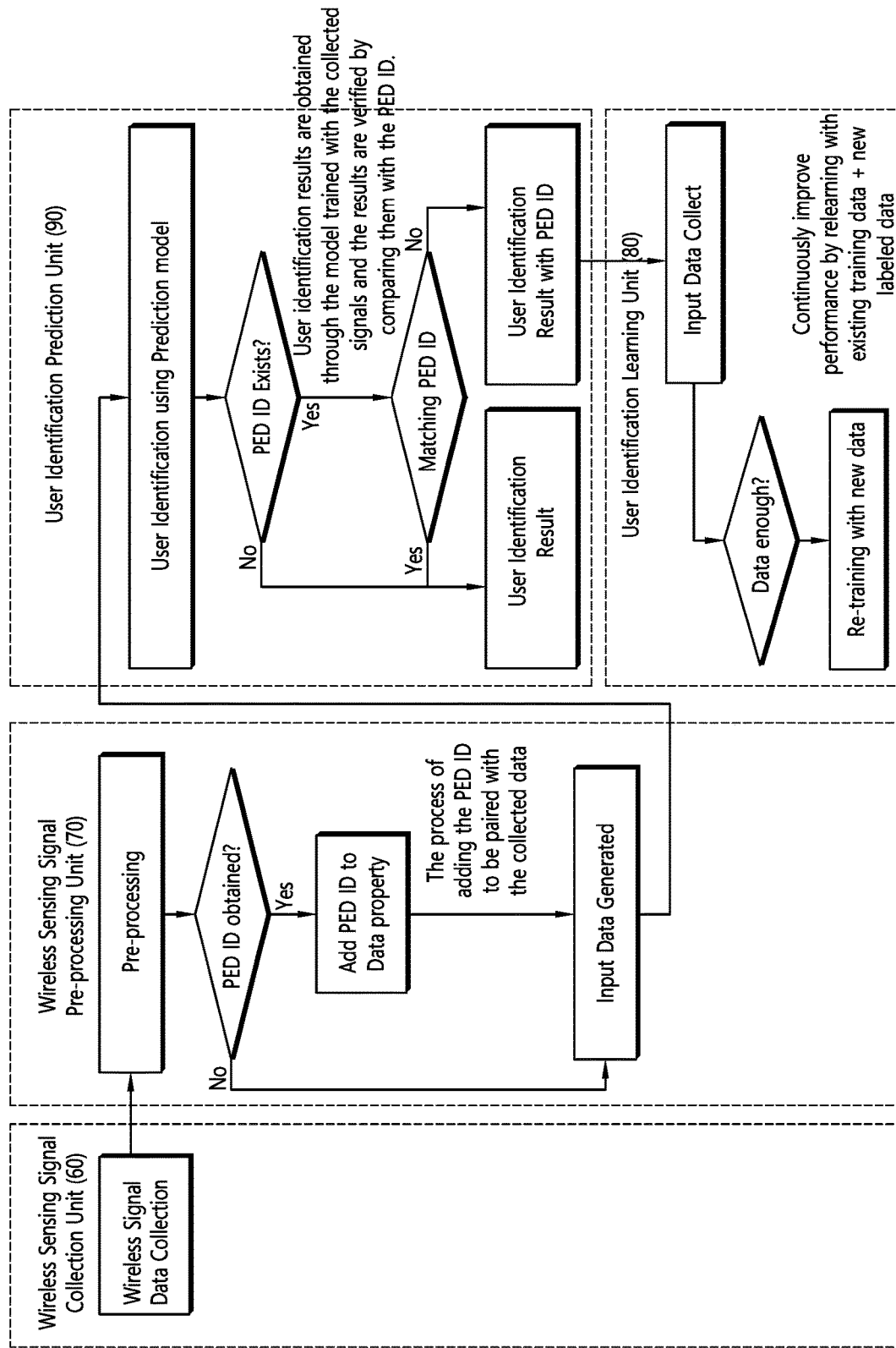
FIG. 17 is a flowchart illustrating a procedure for improving the on-device learning model.

FIG. 17 is a flowchart illustrating a procedure for improving the on-device learning model.

Referring to FIG. 17, the wireless sensing signal collecting unit 60 collects wireless signal data, and the wireless sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. In addition, the wireless sensing signal pre-processing unit 70 generates input data.

The User Identification prediction unit 90 obtains a user identification result using a model learned and predicted based on the input data, and checks whether the PED ID matches the PED ID if it exists. If it matches the PED ID, it is determined that the user identification result is verified, and if it does not match the PED ID, the user identification result is verified together with the PED ID. If the PED ID does not exist, the user identification result is immediately obtained without checking whether the PED ID is matched.

The user identification learning unit 80 may collect input data, and if the data is sufficient, the performance may be continuously improved by re-training with the existing training data and the new labeled data.

Figure 18:
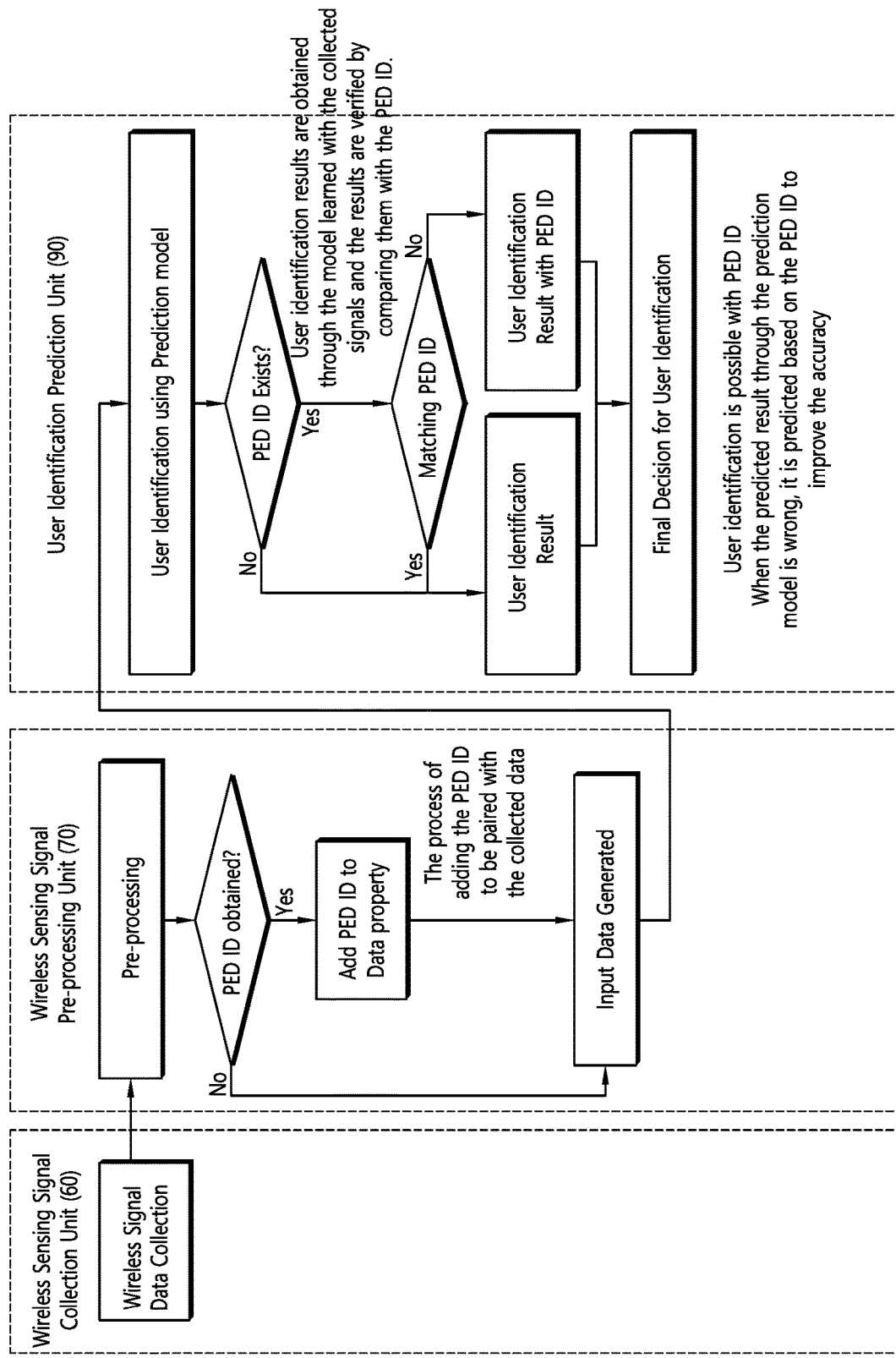
FIG. 18 is a flowchart illustrating a procedure for improving prediction accuracy using a PED ID.

FIG. 18 is a flowchart illustrating a procedure for improving prediction accuracy using a PED ID.

Referring to FIG. 18, the wireless sensing signal collecting unit 60 collects wireless signal data, and the wireless sensing signal pre-processing unit 70 pre-processes the collected signal. The wireless sensing signal pre-processing unit 70 checks whether the PED ID has been obtained through the information exchange network unit 30 or the cloud information providing unit 40, and if it is obtained, the PED ID is added to the data property. This is the process of adding the PED ID that is paired with the collected data. In addition, the wireless sensing signal pre-processing unit 70 generates input data.

The User Identification prediction unit 90 obtains a user identification result using a model learned and predicted based on the input data, and checks whether the PED ID matches the PED ID if it exists. If it matches the PED ID, it is determined that the user identification result is verified, and if it does not match the PED ID, the user identification result is verified together with the PED ID. If the PED ID does not exist, the user identification result is immediately obtained without checking whether the PED ID is matched. This makes the final decision on user identification. According to the above-described embodiment, user identification is possible with the PED ID, and when a result predicted through the prediction model is wrong, the accuracy can be improved by predicting based on the PED ID.

Figure 19:
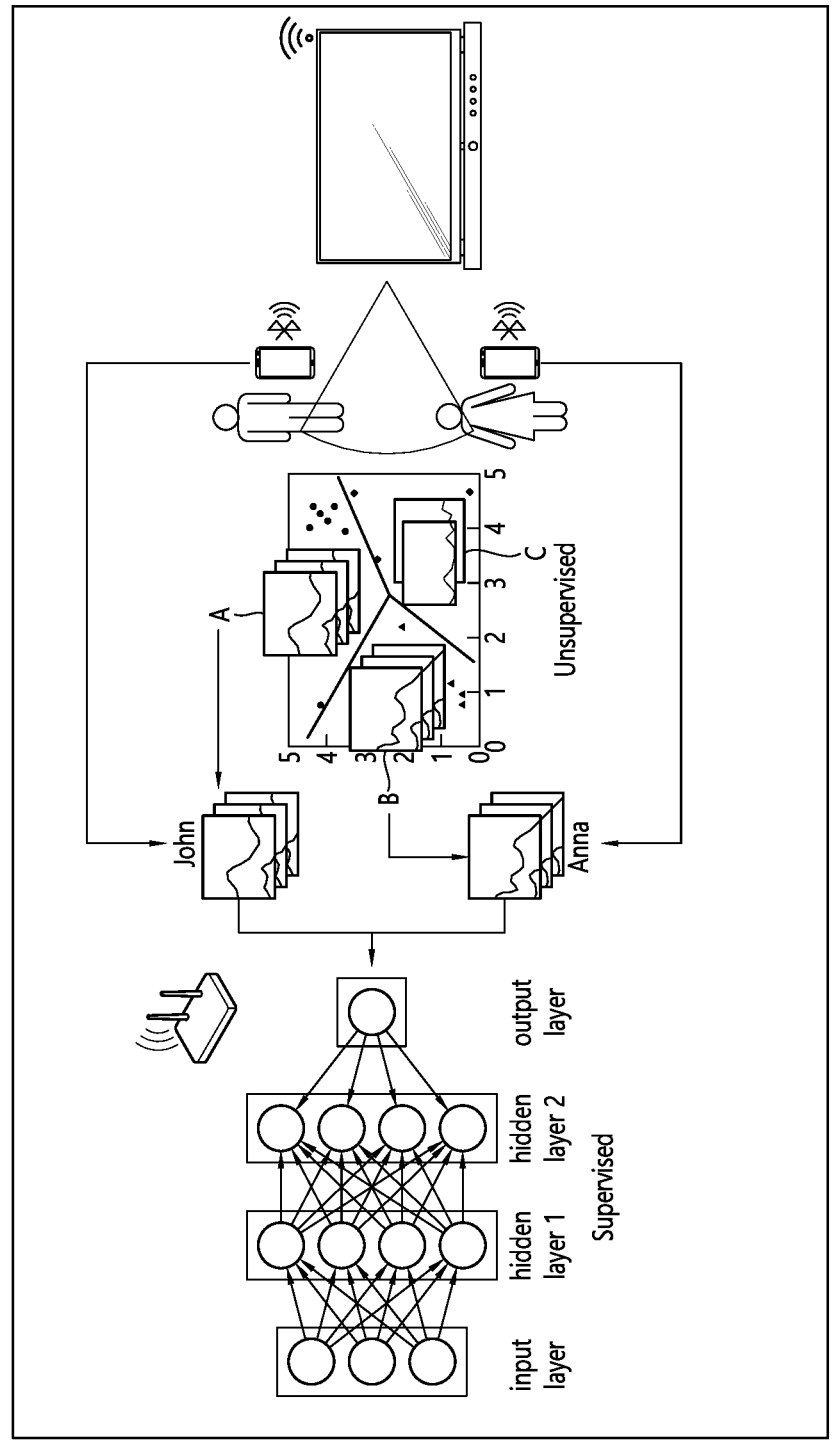
FIG. 19 shows an example of a learning scenario for a future AI home appliance that identifies a person.

FIG. 19 shows an example of a learning scenario for a future AI home appliance that identifies a person.

Referring to FIG. 19, first, the Wireless Sensor of the TV collects each of the wireless signals affected by two users to generate Clusters through Unsupervised Learning. Second, if the user's PED is found during the wireless signal collection process, the ID obtained from the PED is added to the data property of the corresponding signal. Third, using the ID John and Anna obtained in the generated Clusters A and B as the correct answer (Label), a predictive model is created through supervised learning.

Figure 20:
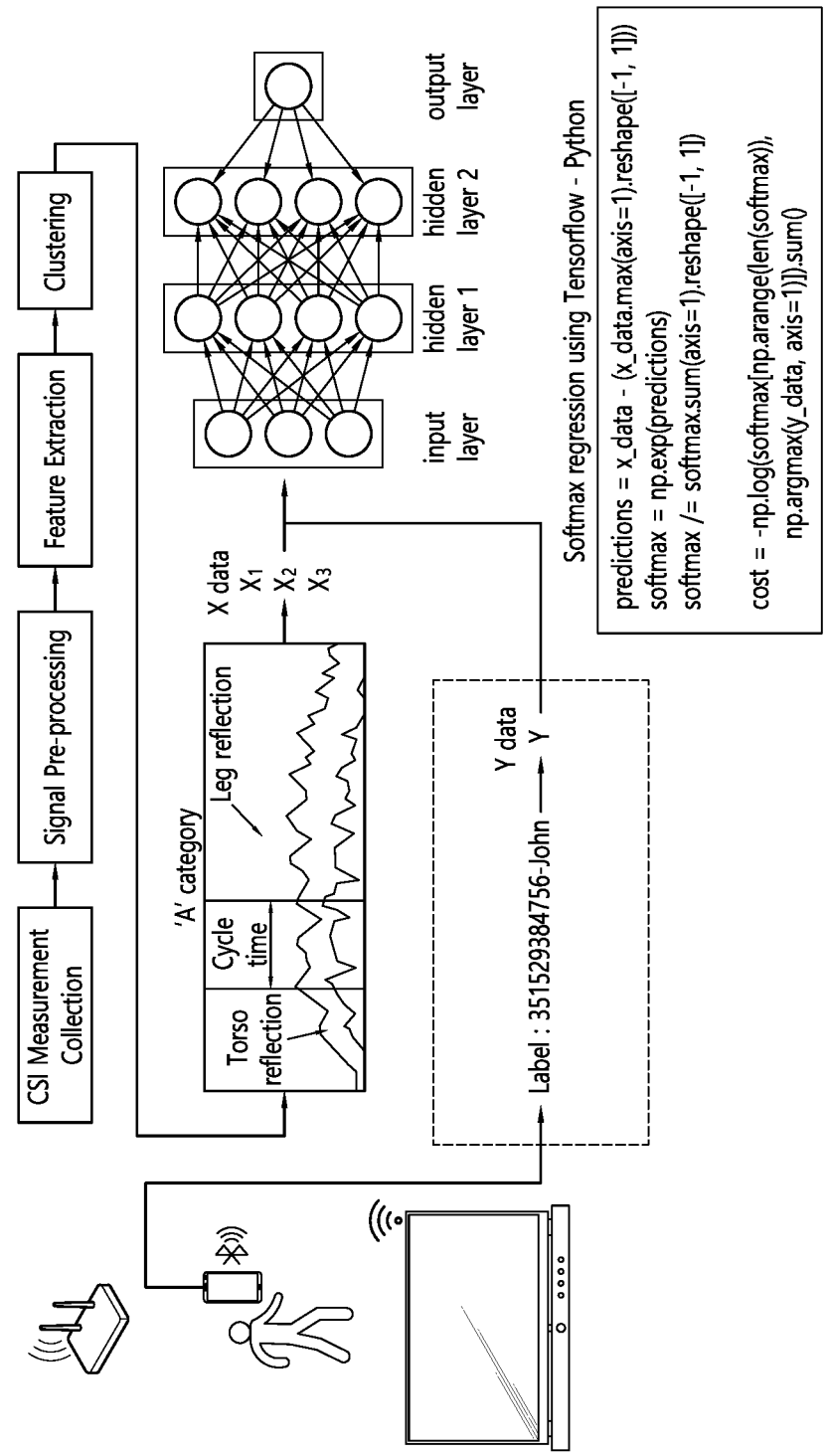
FIG. 20 is a flowchart illustrating a procedure for acquiring a user identification prediction model in a learning scenario for a future AI home appliance that identifies a person.

FIG. 20 is a flowchart illustrating a procedure for acquiring a user identification prediction model in a learning scenario for a future AI home appliance that identifies a person.

Referring to FIG. 20, the user identification device (TV) collects CSI measurement, performs signal pre-processing, extracts features for user identification learning and prediction, and generates clusters through unsupervised learning.

At this time, the generated data of category A (x_data) and PED ID (identification information labeled with John's ID, y_data) are matched to perform supervised learning to generate a user identification prediction model (output layer). In FIG. 20, supervised learning uses softmax regression using Tensorflow-Python, and FIG. 20 shows a corresponding programming tool.

Figure 21:
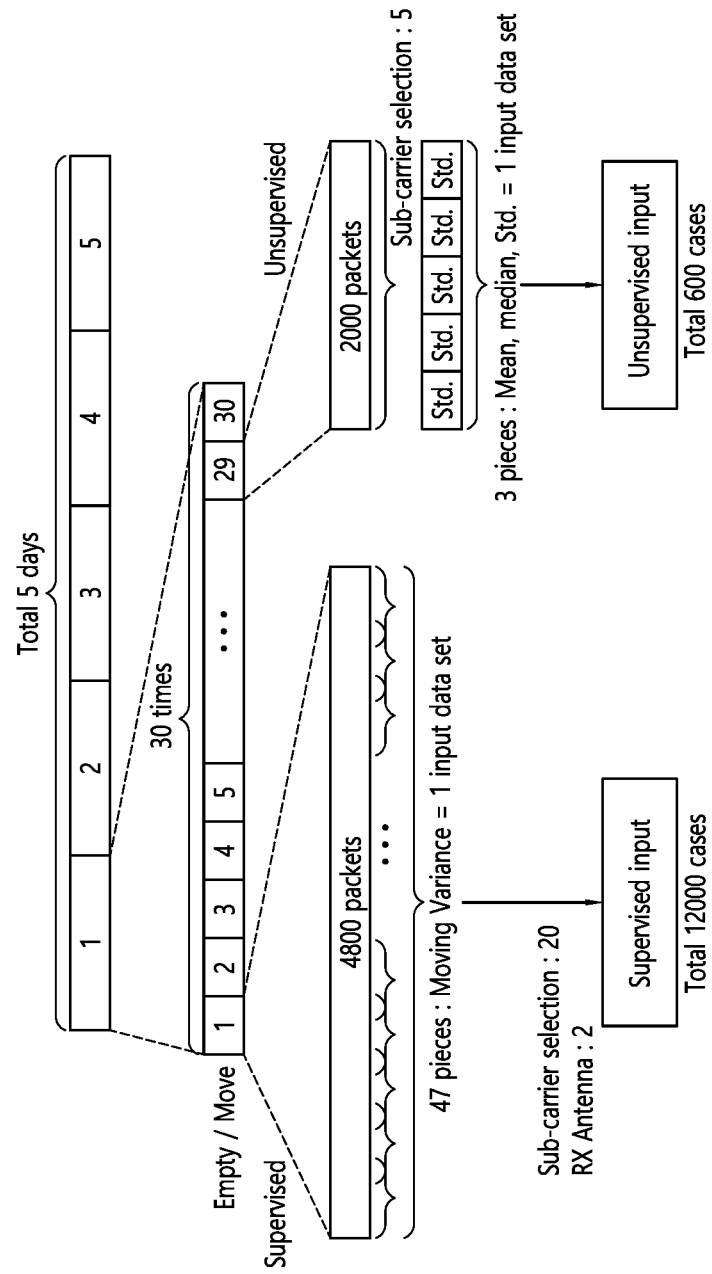
FIG. 21 is an example showing a preprocessing process for generating an unsupervised input data set and a supervised input data set.

FIG. 21 is an example showing a preprocessing process for generating an unsupervised input data set and a supervised input data set.

FIG. 21 shows a preprocessing process for generating the input data set (x_data) of FIG. 20. The input data set can be different depending on whether it is unsupervised or supervised learning. Due to the nature of the algorithm of unsupervised learning and supervised learning, if the same input data set is used, one result may be good, but the other may have poor results. During supervised learning, it is advantageous for certain algorithms to take a large number of data sets. In the case of unsupervised learning, the results of clustering must be produced in a state where there is no correct answer (label), so good results can be obtained only when the characteristics of the data are well revealed. Therefore, even if the same raw data is used, the preprocessing process for creating the input data set may be different as shown in FIG. 21.

In the case of supervised learning, since 4800 packets are included in data once a day and there are 47 moving variances for one input data set, a total of 12000 supervised inputs can be obtained (subcarrier selection: 20, Rx Antenna: 2). On the other hand, in the case of unsupervised learning, 2000 packets are included in the data once a day, and the total number of unsupervised inputs can be 600 as 3 Mean, Median, Std. for one input data set.

Figure 22:
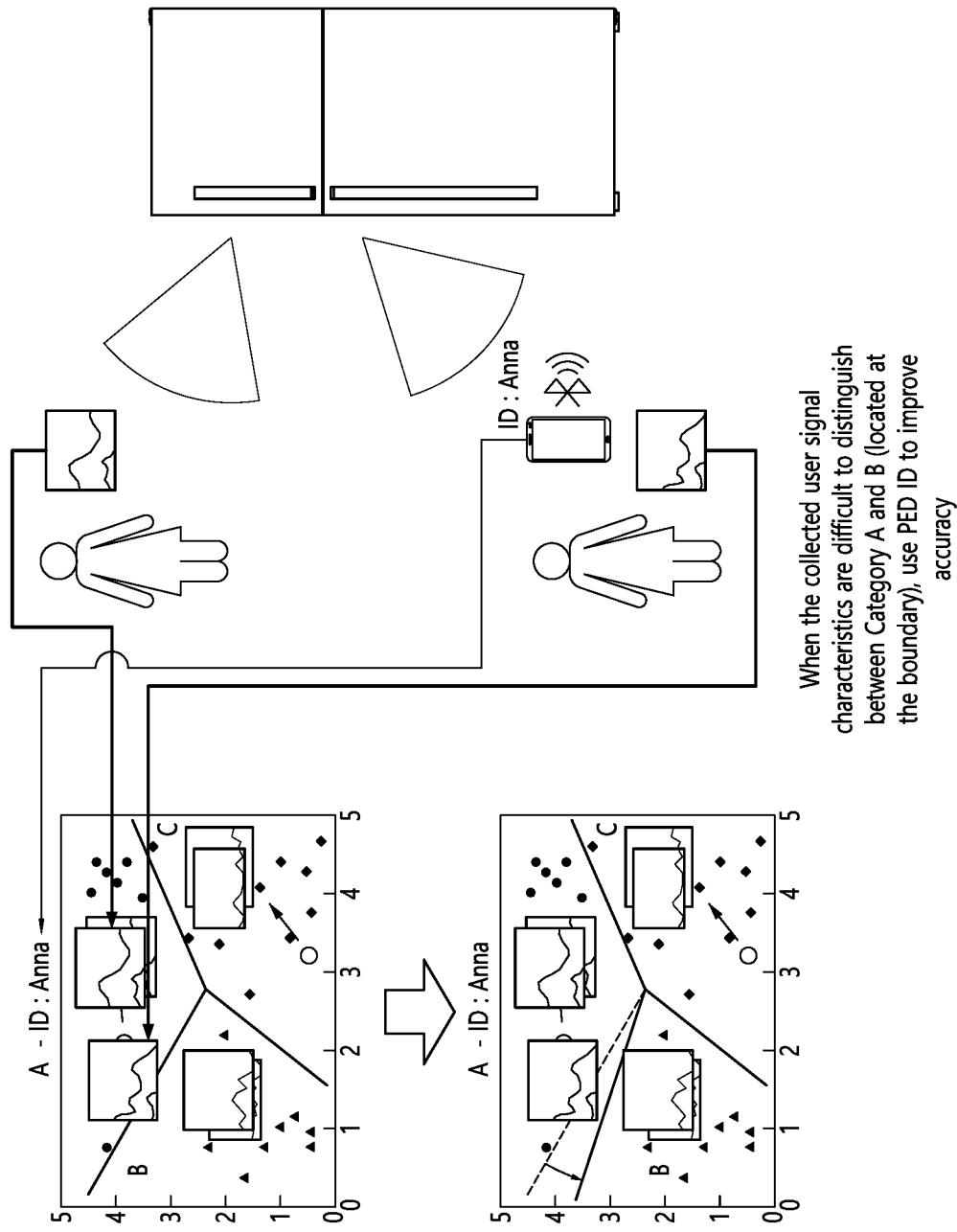
FIG. 22 shows an example of improving accuracy by adding PED ID information to an unsupervised learning method.

FIG. 22 shows an example of improving accuracy by adding PED ID information to an unsupervised learning method.

Referring to FIG. 22, a method of re-clustering including new signal data and clarifying the boundary using the corresponding ID when the new signal data has an ID obtained from the PED after the clustered Category A is generated without the PED ID is proposed. If the characteristics of the collected user signal are difficult to distinguish between Category A and B (located at the boundary), PED ID can be used to improve accuracy.

The upper part of FIG. 22 shows a situation in which Category A is generated by clustering by unsupervised learning without PED ID, and it is unclear which category the collected user signal belongs to because the collected user signal characteristics are at the boundary between Category A and B.

The lower part of FIG. 22 shows that the clustering is performed again by adding the PED ID included in Anna's terminal to clarify the boundary between Category A and B, and the accuracy is improved by increasing the probability that the collected user signal belongs to Category A.

Hereinafter, the above-described embodiment will be described with reference to FIGS. 1 to 22.

Figure 23:
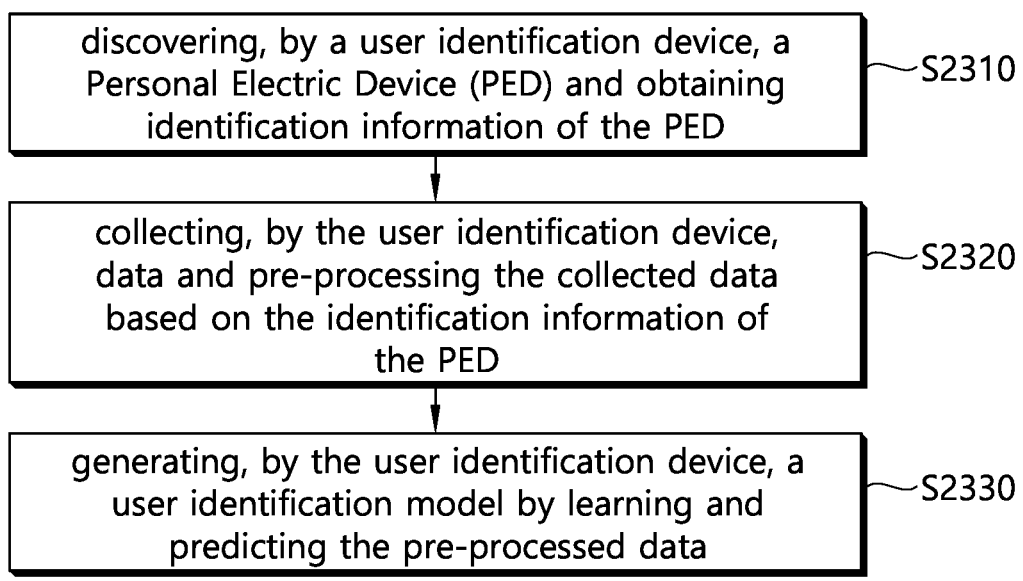
FIG. 23 is a flowchart illustrating a procedure in which the user identification device generates a user identification model according to the present embodiment.

FIG. 23 is a flowchart illustrating a procedure in which the user identification device generates a user identification model according to the present embodiment.

This embodiment proposes a method of generating a user identification model by performing supervised learning by obtaining personal identification information of a user device (PED) and labeling the collected data. This has a new effect of creating a new paradigm of IoT future smart home devices such as artificial intelligence devices that identify people by improving the learning method of wireless sensing-based user identification technology.

In step S2310, the user identification device discovers a PED (Personal Electric Device) and obtains identification information of the PED.

In step S2320, the user identification device collects data and pre-processes the collected data based on the identification information of the PED.

In step S2330, the user identification device generates a user identification model by learning the pre-processed data.

The PED may be discovered through Bluetooth, Wi-Fi, Zigbee, or Near Field Communication (NFC).

The identification information of the PED may be obtained from the PED or a cloud server in which the PED is registered.

The identification information of the PED may include a person's name, an International Mobile Equipment Identity (IMEI), a MAC address, or a serial number.

The pre-processed data may be data in which the collected data and identification information of the PED are matched.

The user identification model may be generated based on supervised learning. The supervised learning may use the identification information of the PED as a correct answer. That is, the obtained identification information of the PED may serve as a correct answer for supervised learning. Alternatively, the obtained identification information of the PED may also serve as a correct answer for semi-supervised learning.

As another example, the pre-processed data may include first and second data. The first data may be data in which the collected data and identification information of the PED are matched. The second data may be collected data that does not match the identification information of the PED. The user identification model may be generated based on semi-supervised learning. The semi-supervised learning may use the identification information of the PED as a correct answer.

The user identification device may generate a cluster based on unsupervised learning for the collected data.

The user identification device may match identification information of the PED to the cluster. The user identification model may be generated based on supervised learning for the data classified by category. The supervised learning may use the identification information of the PED as a correct answer.

The cluster matching the identification information of the PED may include classified data by category. That is, by performing clustering again with the obtained identification information of the PED, it is possible to increase the learning accuracy by clarifying the boundaries of data categories. That is, the above-described example proposes a method of generating a user identification model by giving a correct answer (Label) to a result of classifying data by unsupervised learning and then converting it to supervised learning.

When the user identification model is initially generated, the user identification device may generate a result value based on the initially generated user identification model and identification information of the PED. The user identification device may generate a modified user identification model by re-learning on the result value. That is, the obtained identification information of the PED may be used for re-learning for improving the performance of the learning model. For example, when a new signal and PED identification information come together after the creation of the first user identification model, the correct answer is inferred by comparing the prediction result with the identification information of the PED. It can lead to a re-learning process that corrects incorrect results by feeding back the results to the learning model.

The PED may include an identification information providing part, a user identification device discovery part, and an identification information exchange network part.

The user identification device may include an identification information exchange network part, a PED discovery part, a wireless sensing signal collection part, a wireless sensing signal processing part, a user identification learning part, and a user identification prediction part.

The PED may be discovered through the PED discovery part. The data may be collected through the wireless sensing signal collection part. The collected data may be pre-processed through the wireless sensing signal processing part. The pre-processed data may be learned through the user identification learning part, and the user identification prediction part may predict a user through the generated user identification model.

The user identification device may identify the user of the wireless signal based on the user identification model. That is, the user identification device may identify a person through a learning method using identification information based on wireless sensing.

4. Device Configuration

Figure 24:
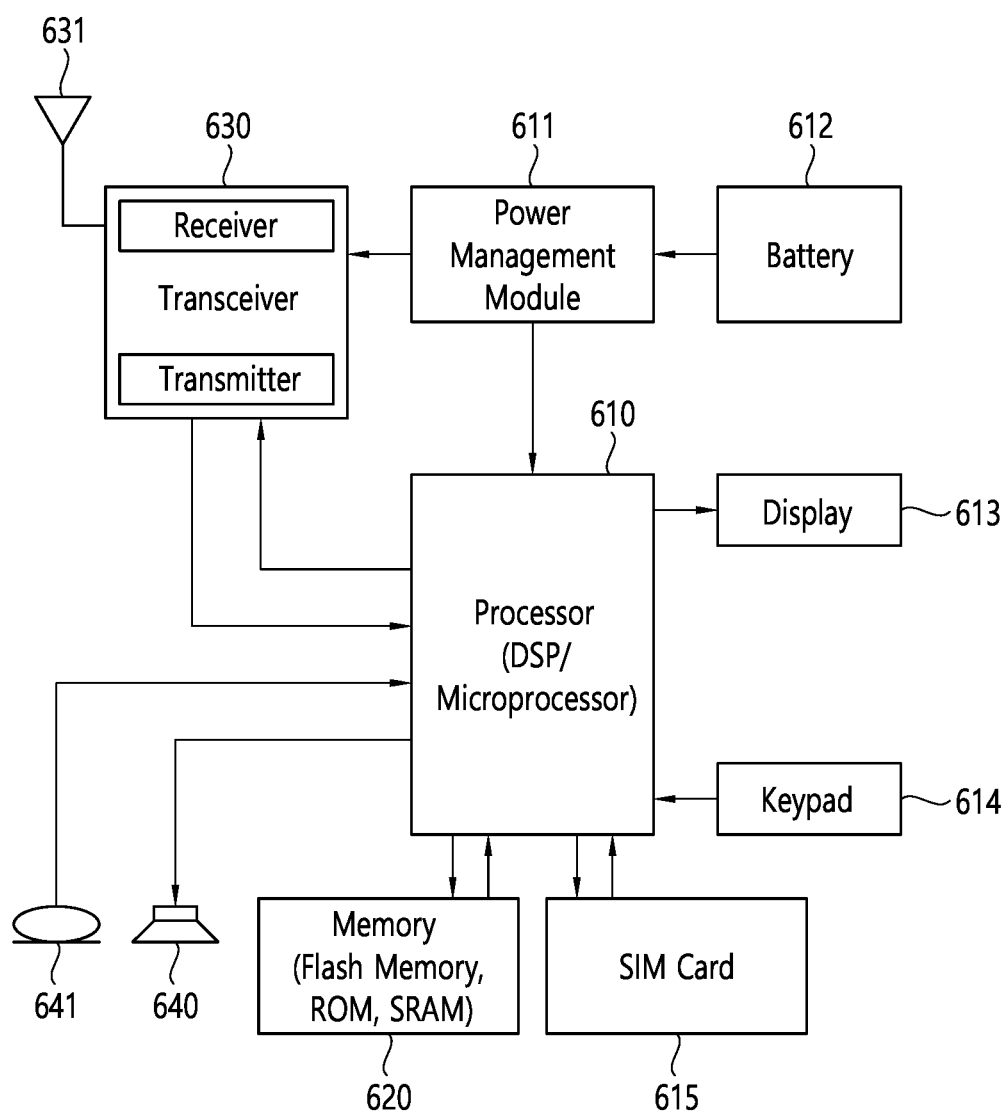
FIG. 24 illustrates modified examples of a transmitting device and/or receiving device of the present specification.

FIG. 24 illustrates modified examples of a transmitting device and/or receiving device of the present specification.

Each device/STA shown in sub-figures (a)/(b) of FIG. 1 may be modified as shown in FIG. 24. A transceiver 630 of FIG. 24 may be the same as the transceiver(s) 113 and 123 of FIG. 1. The transceiver 630 of FIG. 24 may include a receiver and a transmitter.

A processor 610 of FIG. 24 may be the same as the processor(s) 111 and 121 shown in FIG. 1. Alternatively, the processor 610 of FIG. 24 may be the same as the processing chip(s) 114 and 124 shown in FIG. 1.

A memory 150 of FIG. 24 may be the same as the memory(s) 112 and 122 shown in FIG. 1. Alternatively, the memory 150 of FIG. 24 may be a separate external memory that is different from the memory(s) 112 and 122 shown in FIG. 1.

Referring to FIG. 24, the power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices (such as mobile phones and computers).

Referring to FIG. 24, the speaker 640 may output sound-related results processed by the processor 610. The microphone 641 may receive sound-related inputs to be used by the processor 610.

The above-described technical features of the present specification may be applied to various device and methods. For example, the above-described technical features of the present specification may be performed/supported through FIG. 1 and/or FIG. 24. For example, the above-described technical features of the present specification may be applied to only part of FIG. 1 and/or FIG. 24. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 24. For example, an apparatus herein is an apparatus for generating a user identification model based on wireless sensing, the apparatus comprising a memory and a processor operatively coupled to the memory, the processor is configured to discover a Personal Electric Device (PED) and obtain identification information of the PED, collect data, and pre-processe the collected data based on the identification information of the PED, and generate user identification model by learning the pre-processed data.

The PED may be discovered through Bluetooth, Wi-Fi, Zigbee, or Near Field Communication (NFC).

The identification information of the PED may be obtained from the PED or a cloud server in which the PED is registered.

The identification information of the PED may include a person's name, an International Mobile Equipment Identity (IMEI), a MAC address, or a serial number.

The pre-processed data may be data in which the collected data and identification information of the PED are matched.

The user identification model may be generated based on supervised learning. The supervised learning may use the identification information of the PED as a correct answer. That is, the obtained identification information of the PED may serve as a correct answer for supervised learning. Alternatively, the obtained identification information of the PED may also serve as a correct answer for semi-supervised learning.

As another example, the pre-processed data may include first and second data. The first data may be data in which the collected data and identification information of the PED are matched. The second data may be collected data that does not match the identification information of the PED. The user identification model may be generated based on semi-supervised learning. The semi-supervised learning may use the identification information of the PED as a correct answer.

The user identification device may generate a cluster based on unsupervised learning for the collected data.

The user identification device may match identification information of the PED to the cluster. The user identification model may be generated based on supervised learning for the data classified by category. The supervised learning may use the identification information of the PED as a correct answer.

The cluster matching the identification information of the PED may include classified data by category. That is, by performing clustering again with the obtained identification information of the PED, it is possible to increase the learning accuracy by clarifying the boundaries of data categories. That is, the above-described example proposes a method of generating a user identification model by giving a correct answer (Label) to a result of classifying data by unsupervised learning and then converting it to supervised learning.

When the user identification model is initially generated, the user identification device may generate a result value based on the initially generated user identification model and identification information of the PED. The user identification device may generate a modified user identification model by re-learning on the result value. That is, the obtained identification information of the PED may be used for re-learning for improving the performance of the learning model. For example, when a new signal and PED identification information come together after the creation of the first user identification model, the correct answer is inferred by comparing the prediction result with the identification information of the PED. It can lead to a re-learning process that corrects incorrect results by feeding back the results to the learning model.

The PED may include an identification information providing part, a user identification device discovery part, and an identification information exchange network part.

The user identification device may include an identification information exchange network part, a PED discovery part, a wireless sensing signal collection part, a wireless sensing signal processing part, a user identification learning part, and a user identification prediction part.

The PED may be discovered through the PED discovery part. The data may be collected through the wireless sensing signal collection part. The collected data may be pre-processed through the wireless sensing signal processing part. The pre-processed data may be learned through the user identification learning part, and the user identification prediction part may predict a user through the generated user identification model.

The user identification device may identify the user of the wireless signal based on the user identification model. That is, the user identification device may identify a person through a learning method using identification information based on wireless sensing.

The technical features of the present specification may be implemented based on a computer readable medium (CRM). For example, the CRM that is proposed in the present specification is a computer readable medium including an instruction being executed by at least one processor.

The CRM may store instructions performing operations including the steps of discovering a Personal Electric Device (PED) and obtaining identification information of the PED; collecting data and pre-processing the collected data based on identification information of the PED; and generating a user identification model by learning the pre-processed data. The instructions that are stored in the CRM of the present specification may be executed by at least one processor. At least one processor being related to the CRM of the present specification may be the processor(s) 111 and 121 or processing chip(s) 114 and 124 of FIG. 1, or the processor 610 of FIG. 24. Meanwhile, the CRM of the present specification may be the memory(s) 112 and 122 of FIG. 1, or the memory 620 of FIG. 24, or a separate external memory/storage medium/disc, and so on.

The PED may be discovered through Bluetooth, Wi-Fi, Zigbee, or Near Field Communication (NFC).

The identification information of the PED may be obtained from the PED or a cloud server in which the PED is registered.

The identification information of the PED may include a person's name, an International Mobile Equipment Identity (IMEI), a MAC address, or a serial number.

The pre-processed data may be data in which the collected data and identification information of the PED are matched.

The user identification model may be generated based on supervised learning. The supervised learning may use the identification information of the PED as a correct answer. That is, the obtained identification information of the PED may serve as a correct answer for supervised learning. Alternatively, the obtained identification information of the PED may also serve as a correct answer for semi-supervised learning.

As another example, the pre-processed data may include first and second data. The first data may be data in which the collected data and identification information of the PED are matched. The second data may be collected data that does not match the identification information of the PED. The user identification model may be generated based on semi-supervised learning. The semi-supervised learning may use the identification information of the PED as a correct answer.

The user identification device may generate a cluster based on unsupervised learning for the collected data.

The user identification device may match identification information of the PED to the cluster. The user identification model may be generated based on supervised learning for the data classified by category. The supervised learning may use the identification information of the PED as a correct answer.

The cluster matching the identification information of the PED may include classified data by category. That is, by performing clustering again with the obtained identification information of the PED, it is possible to increase the learning accuracy by clarifying the boundaries of data categories. That is, the above-described example proposes a method of generating a user identification model by giving a correct answer (Label) to a result of classifying data by unsupervised learning and then converting it to supervised learning.

When the user identification model is initially generated, the user identification device may generate a result value based on the initially generated user identification model and identification information of the PED. The user identification device may generate a modified user identification model by re-learning on the result value. That is, the obtained identification information of the PED may be used for re-learning for improving the performance of the learning model. For example, when a new signal and PED identification information come together after the creation of the first user identification model, the correct answer is inferred by comparing the prediction result with the identification information of the PED. It can lead to a re-learning process that corrects incorrect results by feeding back the results to the learning model.

The PED may include an identification information providing part, a user identification device discovery part, and an identification information exchange network part.

The user identification device may include an identification information exchange network part, a PED discovery part, a wireless sensing signal collection part, a wireless sensing signal processing part, a user identification learning part, and a user identification prediction part.

The PED may be discovered through the PED discovery part. The data may be collected through the wireless sensing signal collection part. The collected data may be pre-processed through the wireless sensing signal processing part. The pre-processed data may be learned through the user identification learning part, and the user identification prediction part may predict a user through the generated user identification model.

The user identification device may identify the user of the wireless signal based on the user identification model. That is, the user identification device may identify a person through a learning method using identification information based on wireless sensing.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method by a user identification device in a wireless local area network (WLAN) system, the method comprising:
    discovering a PED (Personal Electric Device) and obtaining identification information of the PED;
    collecting data and pre-processing the collected data based on the identification information of the PED; and
    generating a user identification model by learning the pre-processed data,
    wherein the pre-processed data is data in which the collected data and identification information of the PED are matched,
    wherein the user identification model is generated based on supervised learning, and
    wherein the supervised learning uses the identification information of the PED as a correct answer.

2. The method of claim 1, wherein the PED is discovered through Bluetooth, Wi-Fi, Zigbee, or Near Field Communication (NFC).

3. The method of claim 1, wherein the identification information of the PED is obtained from the PED or a cloud server in which the PED is registered,
    wherein the identification information of the PED includes a person's name, an International Mobile Equipment Identity (IMEI), a MAC address, or a serial number.

4. The method of claim 1, wherein the pre-processed data includes first and second data,
    wherein the first data is data in which the collected data and identification information of the PED are matched,
    wherein the second data is collected data that does not match the identification information of the PED,
    wherein the user identification model is generated based on semi-supervised learning,
    wherein the semi-supervised learning uses the identification information of the PED as a correct answer.

5. The method of claim 1, further comprising:
    generating a cluster based on unsupervised learning for the collected data; and
    matching identification information of the PED to the cluster,
    wherein the cluster matching the identification information of the PED includes classified data by category.

6. The method of claim 5, wherein the user identification model is generated based on supervised learning for the data classified by category,
    wherein the supervised learning uses the identification information of the PED as a correct answer.

7. The method of claim 1, wherein when the user identification model is initially generated, further comprising:
    generating a result value based on the initially generated user identification model and identification information of the PED; and
    generating a modified user identification model by re-learning on the result value.

8. The method of claim 1, further comprising:
    identifying a user of a wireless signal based on the user identification model.

9. The method of claim 1,
    wherein the PED includes an identification information providing part, a user identification device discovery part, and an identification information exchange network part,
    wherein the user identification device includes an identification information exchange network part, a PED discovery part, a wireless sensing signal collection part, a wireless sensing signal processing part, a user identification learning part, and a user identification prediction part,
    wherein the PED is discovered through the PED discovery part,
    wherein the data is collected through the wireless sensing signal collection part,
    wherein the collected data is pre-processed through the wireless sensing signal processing part,
    wherein the pre-processed data is learned through the user identification learning part, and
    wherein the user identification prediction part predicts a user through the generated user identification model.

10. A user identification device in a wireless local area network (WLAN) system, the user identification device comprising:
a memory;
a transceiver; and
a processor being operatively connected to the memory and the transceiver,
wherein the processor is configured to:
discover a PED (Personal Electric Device) and obtaining identification information of the PED;
collect data and pre-processing the collected data based on the identification information of the PED; and
generate a user identification model by learning the pre-processed data,
wherein the pre-processed data is data in which the collected data and identification information of the PED are matched,
wherein the user identification model is generated based on supervised learning, and
wherein the supervised learning uses the identification information of the PED as a correct answer.

11. The user identification device of claim 10, wherein the identification information of the PED is obtained from the PED or a cloud server in which the PED is registered,
wherein the identification information of the PED includes a person's name, an International Mobile Equipment Identity (IMEI), a MAC address, or a serial number.

12. The user identification device of claim 10, wherein the pre-processed data includes first and second data,
wherein the first data is data in which the collected data and identification information of the PED are matched,
wherein the second data is collected data that does not match the identification information of the PED,
wherein the user identification model is generated based on semi-supervised learning,
wherein the semi-supervised learning uses the identification information of the PED as a correct answer.

13. The user identification device of claim 10, wherein the processor is further configured to:
generate a cluster based on unsupervised learning for the collected data; and
match identification information of the PED to the cluster,
wherein the cluster matching the identification information of the PED includes classified data by category.

14. The user identification device of claim 13, wherein the user identification model is generated based on supervised learning for the data classified by category,
wherein the supervised learning uses the identification information of the PED as a correct answer.

15. The user identification device of claim 10, wherein when the user identification model is initially generated, wherein the processor is further configured to:
generate a result value based on the initially generated user identification model and identification information of the PED; and
generate a modified user identification model by re-learning on the result value.

16. The user identification device of claim 10, wherein the processor is further configured to:
identify a user of a wireless signal based on the user identification model.

* * * * *